(12) United States Patent
Revaud et al.

(10) Patent No.: US 11,521,072 B2
(45) Date of Patent: Dec. 6, 2022

(54) TRAINING A CONVOLUTIONAL NEURAL NETWORK FOR IMAGE RETRIEVAL WITH A LISTWISE RANKING LOSS FUNCTION

(71) Applicant: NAVER CORPORATION, Gyeonggi-do (KR)

(72) Inventors: Jérome Revaud, Meylan (FR); Jon Almazan, London (GB); Cesar De Souza, Grenoble (FR); Rafael Sampaio De Rezende, Grenoble (FR)

(73) Assignee: NAVER CORPORATION, Gyeonggi-do (KR)

( * ) Notice: Subject to any disclaimer, the term of this patent is extended or adjusted under 35 U.S.C. 154(b) by 493 days.

(21) Appl. No.: 16/787,594

(22) Filed: Feb. 11, 2020

(65) Prior Publication Data

US 2020/0342328 A1 Oct. 29, 2020

(30) Foreign Application Priority Data

Apr. 26, 2019 (EP) .................................... 19305542

(51) Int. Cl.
*G06N 3/08* (2006.01)
*G06F 17/15* (2006.01)
(Continued)

(52) U.S. Cl.
CPC ........... *G06N 3/084* (2013.01); *G06F 16/532* (2019.01); *G06F 17/15* (2013.01); *G06F 17/18* (2013.01);
(Continued)

(58) Field of Classification Search
CPC .... G06N 3/084; G06N 3/0472; G06N 3/0454; G06N 3/082; G06N 3/08; G06N 3/0445;
(Continued)

(56) References Cited

U.S. PATENT DOCUMENTS 10,937,540 B2 * 3/2021 Madani ................ G06N 3/0481
10,992,839 B2 * 4/2021 Kang ................... H04N 1/4413
(Continued)

OTHER PUBLICATIONS

"Deep residual learning for image recognition" by K. He, X. Zhang, S. Ren, and J. Sun, in Conference on Computer Vision and Pattern Recognition, CVPR, 2016.
(Continued)

*Primary Examiner* — Michael S Osinski
(74) *Attorney, Agent, or Firm* — Harness, Dickey & Pierce, P.L.C.

(57) ABSTRACT

A method of performing image retrieval includes: obtaining a query image; generating a global feature descriptor of the query image by inputting the query image into a convolutional neural network (CNN) and obtaining the global feature descriptor as an output of the CNN, where parameters of the CNN are learned during training of the CNN on a batch of training images using a listwise ranking loss function and optimizing a quantized mean average precision ranking evaluation metric; determining similarities between the query image and other images based on distances between the global feature descriptor of the query image and global feature descriptors of the other images, respectively; ranking the other images based on the similarities, respectively; and selecting a set of the other images based on the similarities between the query image and the other images.

21 Claims, 11 Drawing Sheets

(51) Int. Cl.
    *G06F 17/18* (2006.01)
    *G06K 9/62* (2022.01)
    *G06N 3/04* (2006.01)
    *G06F 16/532* (2019.01)

(52) U.S. Cl.
    CPC ......... *G06K 9/6215* (2013.01); *G06N 3/0472* (2013.01)

(58) Field of Classification Search
    CPC ........ G06F 16/532; G06F 17/15; G06F 17/18; G06F 16/56; G06F 16/24578; G06K 9/6215; G06K 9/6256; G06K 9/628; G06K 9/6262; G06K 9/6267; G06V 10/82; G06V 10/764; G06V 10/454; G06V 20/41; G06V 2201/03; G06V 10/40; G06V 10/464; G06V 10/761; G06V 10/56; G06T 2207/20081; G06T 2207/20084; G06T 7/0012; G06T 2207/30024; G06T 7/10
    See application file for complete search history.

(56) References Cited

U.S. PATENT DOCUMENTS

| | | | | |
|---|---|---|---|---|
| 11,288,805 | B2* | 3/2022 | Geipel | G06T 7/0016 |
| 2010/0177956 | A1* | 7/2010 | Cooper | G06V 20/70 |
| | | | | 382/159 |
| 2012/0243789 | A1* | 9/2012 | Yang | G06V 10/464 |
| | | | | 382/195 |
| 2015/0238148 | A1* | 8/2015 | Georgescu | G06T 7/73 |
| | | | | 600/408 |
| 2017/0083792 | A1* | 3/2017 | Rodriguez-Serrano | |
| | | | | G06F 16/5854 |
| 2017/0309004 | A1* | 10/2017 | Zepeda Salvatierra | G06T 5/20 |
| 2018/0053057 | A1* | 2/2018 | De Souza | G06V 10/7753 |
| 2019/0108446 | A1* | 4/2019 | Lyu | G06V 10/82 |
| 2019/0318171 | A1* | 10/2019 | Wang | G06V 10/454 |
| 2019/0325275 | A1* | 10/2019 | Lee | G06V 20/41 |
| 2020/0134778 | A1* | 4/2020 | He | G06V 10/454 |
| 2020/0210708 | A1* | 7/2020 | Jia | G06T 7/269 |
| 2020/0394518 | A1* | 12/2020 | Sirdey | G06N 3/0454 |
| 2021/0090247 | A1* | 3/2021 | Jeon | G06N 3/088 |
| 2021/0125077 | A1* | 4/2021 | Fidler | G06N 3/0454 |
| 2021/0235085 | A1* | 7/2021 | Chen | H04N 19/46 |
| 2021/0279513 | A1* | 9/2021 | Jie | G06V 10/764 |
| 2021/0279929 | A1* | 9/2021 | Murray | G06N 3/084 |
| 2022/0139072 | A1* | 5/2022 | Klaiman | G16H 30/40 |
| | | | | 382/159 |
| 2022/0237890 | A1* | 7/2022 | Choi | G01S 17/931 |
| 2022/0237900 | A1* | 7/2022 | Quellec | G06N 3/0454 |

OTHER PUBLICATIONS

A. Babenko and V. Lempitsky. Aggregating local deep features for image retrieval. In ICCV, 2015.
A. Babenko, A. Slesarev, A. Chigorin, and V. Lempitsky. Neural codes for image retrieval. In ECCV, 2014.
A. Behl et al.: "Optimizing average precision using weakly supervised data", Institute of Electrical and Electronics Engineers, IEEE TPAMI 2015.
A. Gordo, J. A. Rodriguez-Serrano, F. Perronnin, and E. Valveny. Leveraging category-level labels for instance-level image retrieval. In CVPR, 2012.
A. Gordo, J. Almazán, J. Revaud, and D. Larlus. End-to-end learning of deep visual representations for image retrieval. IJCV, 2017.
A. Gordo, J. Almazán, J. Revaud, and D. Larlus. Deep image retrieval: Learning global representations for image search. In ECCV, 2016.
A. Hermans, L. Beyer, and B. Leibe. In defense of the triplet loss for person re-identification. arXiv preprint, 2017.
A. Iscen, G. Tolias, Y. Avrithis, and O. Chum. Efficient diffusion on region manifolds: Recovering small objects with compact CNN representations. In CVPR, 2017.
A. Mishchuk, D. Mishkin, F. Radenovic, and J. Matas. Working hard to know your neighbor's margins: Local descriptor learning loss. In NIPS, 2017.
A. S. Razavian, H. Azizpour, J. Sullivan, and S. Carlsson. CNN features off-the-shelf: An astounding baseline for recognition. In CVPRW, 2014.
A. Trotman. Learning to rank. Information Retrieval, 2005.
B. Harwood, V. Kumar B G, G. Carneiro, I. Reid, and T. Drummond. Smart mining for deep metric learning. In ICCV, 2017.
C. Burges, T. Shaked, E. Renshaw, A. Lazier, M. Deeds, N. Hamilton, and G. Hullender. Learning to rank using gradient descent. In ICML, 2005.
C. Corbiere, H. Ben-Younes, A. Ramé, and C. Ollion. Leveraging weakly annotated data for fashion image retrieval and label prediction. In ICCVW, 2017.
C. Wang, X. Lan, and X. Zhang. How to train triplet networks with 100k identities? In ICCVW, 2017.
D. G. Lowe. Distinctive image features from scale-invariant keypoints. IJCV, 2004.
D. P. Kingma and J. Ba. Adam: A method for stochastic optimization. arXiv preprint, 2014.
E. Spyromitros-Xioufis, S. Papadopoulos, I. Y. Kompatsiaris, G. Tsoumakas, and I. Vlahavas. A comprehensive study over VLAD and product quantization in large-scale image retrieval. IEEE Transactions on Multimedia, 2014.
E. Ustinova and V. Lempitsky. Learning deep embeddings with histogram loss. In NIPS. 2016.
European Search Report for European Application No. EP19305542.3 dated Oct. 14, 2019.
F. Cakir, K. He, S. A. Bargal, and S. Sclaroff. MIHash: Online hashing with mutual information. In ICCV, 2017.
F. Faghri, D. J. Fleet, J. R. Kiros, and S. Fidler. VSE++: Improving visual-semantic embeddings with hard negatives. In BMVC, 2018.
F. Radenović, G. Tolias, and O. Chum. Fine-tuning CNN image retrieval with no human annotation. TPAMI, 2018.
F. Radenović, A. Iscen, G. Tolias, Y. Avrithis, and O. Chum. Revisiting Oxford and Paris: Large-scale image retrieval benchmarking. In CVPR, 2018.
F. Radenović, G. Tolias, and O. Chum. CNN image retrieval learns from BoW: Unsupervised fine-tuning with hard examples. In ECCV, 2016.
F. Schroff, D. Kalenichenko, and J. Philbin. FaceNet: A unified embedding for face recognition and clustering. In CVPR, 2015.
G. Csurka, C. Dance, L. Fan, J. Williamowski, and C. Bray. Visual categorization with bags of keypoints. In ECCVW, 2004.
G. Tolias, R. Sicre, and H. Jégou. Particular object retrieval with integral max-pooling of CNN activations. In ICLR, 2016.
H. Jégou and O. Chum. Negative evidences and co-occurences in image retrieval: The benefit of PCA and whitening. In ECCV. 2012.
H. Chen, Y. Wang, Y. Shi, K. Yan, M. Geng, Y. Tian, and T. Xiang. Deep transfer learning for person re-identification. In International Conference on Multimedia Big Data, 2018.
H. Jégou and A. Zisserman. Triangulation embedding and democratic aggregation for image search. In CVPR, 2014.
H. Noh, A. Araujo, J. Sim, T. Weyand, and B. Han. Large-scale image retrieval with attentive deep local features. In ICCV, 2017.
H. O. Song, Y. Xiang, S. Jegelka, and S. Savarese. Deep metric learning via lifted structured feature embedding. In CVPR, 2016.
H. Shi, Y. Yang, X. Zhu, S. Liao, Z. Lei, W. Zheng, and S. Z. Li. Embedding deep metric for person re-identification: A study against large variations. In ECCV, 2016.
I. Guy, A. Nus, D. Pelleg, and I. Szpektor. Care to share?: Learning to rank personal photos for public sharing. In International Conference on Web Search and Data Mining, 2018.
J. Philbin, O. Chum, M. Isard, J. Sivic, and A. Zisserman. Object retrieval with large vocabularies and fast spatial matching. In CVPR, 2007.

(56) References Cited

OTHER PUBLICATIONS

J. Philbin, O. Chum, M. Isard, J. Sivic, and A. Zisserman. Lost in quantization: Improving particular object retrieval in large-scale image databases. In CVPR, 2008.
K. He, F. Cakir, S. A. Bargal, and S. Sclaroff. Hashing as tie-aware learning to rank. In CVPR, 2018.
K. He, X. Zhang, S. Ren, and J. Sun. Deep residual learning for image recognition. In CVPR, 2016.
K. He, Y. Lu, and S. Sclaroff: "Local descriptors optimized for average precision", in Conference on Computer Vision and Pattern Recognition, CVPR, 2018.
K. Kishida. Property of average precision and its generalization: An examination of evaluation indicator for information retrieval experiments. NII Technical Reports, 2005.
K. Sohn. Improved deep metric learning with multi-class n-pair loss objective. In NIPS, 2016.
Nimit Sharad Sohoni et al: "Low-Memory Neural Network Training: A Technical Report", arxiv.org, Cornell University Library, 201 OLIN Library Cornell University Ithaca, NY 14853, Apr. 24, 2019 (Apr. 24, 2019), XP081172957.
O. Rippel, M. Paluri, P. Dollar, and L. Bourdev. Metric learning with adaptive density discrimination. In ICLR, 2016.
O. Russakovsky, J. Deng, H. Su, J. Krause, S. Satheesh, S. Ma, Z. Huang, A. Karpathy, A. Khosla, M. Bernstein, A. C. Berg, and L. Fei-Fei. ImageNet large-scale visual recognition challenge. IJCV, 2015.
P. Henderson and V. Ferrari. End-to-end training of object class detectors for mean average precision. In ACCV, 2016.
P. Mohapatra et al: "Efficient optimization for average precision SVM", in Neural Information Processing Systems, NIPS 2014.
R. Arandjelovic and A. Zisserman. Three things everyone should know to improve object retrieval. In CVPR, 2012.
R. Arandjelovic, P. Gronat, A. Torii, T. Pajdla, and J. Sivic. NetVLAD: CNN architecture for weakly supervised place recognition. CoRR, abs/1511.07247, 2015.
R. Manmatha, C.-Y. Wu, A. J. Smola, and P. Krähenbühl. Sampling matters in deep embedding learning. In ICCV, 2017.
T. Hazan et al.: "Direct loss minimization for structure prediction", in NIPS 2010.
T.-Y. Liu et al. Learning to rank for information retrieval. Foundations and Trends in Information Retrieval, 2009.
W. Chen, X. Chen, J. Zhang, and K. Huang. A multi-task deep network for person re-identification. In AAAI, 2017.
W. Chen, X. Chen, J. Zhang, and K. Huang. Beyond triplet loss: a deep quadruplet network for person re-identification. In CVPR, 2017.
W. Wang, Y. Xu, J. Shen, and S.-C. Zhu. Attentive fashion grammar network for fashion landmark detection and clothing category classification. In CVPR, 2018.
Y. Gong, S. Lazebnik, A. Gordo, and F. Perronnin. Iterative quantization: A procrustean approach to learning binary codes for large-scale image retrieval. IEEE TPAMI, 2013.
Y. Kalantidis, C. Mellina, and S. Osindero. Cross-dimensional weighting for aggregated deep convolutional features. In ECCVW, 2016.
Y. Movshovitz-Attias, A. Toshev, T. K. Leung, S. Ioffe, and S. Singh. No fuss distance metric learning using proxies. In ICCV, 2017.
Y. Song et al.: "Training deep neural networks via direct loss minimization", in International Conference on Machine Learning, ICML 2016.
Y. Yue et al.: "A support vector method for optimizing average precision", in Special Interest Group on Information Retrieval, SIGIR 2007.
Z. Cao, T. Qin, T.-Y. Liu, M.-F. Tsai, and H. Li. Learning to rank: from pairwise approach to listwise approach. In ICML, 2007.
Z. Liu, P. Luo, S. Qiu, X. Wang, and X. Tang. DeepFashion: Powering robust clothes recognition and retrieval with rich annotations. In CVPR, 2016.

\* cited by examiner

TRAINING A CONVOLUTIONAL NEURAL NETWORK FOR IMAGE RETRIEVAL WITH A LISTWISE RANKING LOSS FUNCTION

CROSS-REFERENCE TO RELATED APPLICATIONS

This application claims the benefit of European Patent Application No. EP19305542.3, filed on Apr. 26, 2019. The entire disclosure of the application referenced above is incorporated herein by reference.

FIELD

The present disclosure relates to image retrieval and, in particular, to a system, method and computer-readable medium for performing image retrieval using a convolutional neural network (CNN).

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Image retrieval consists in finding, given a query image, all images containing relevant content within a large database. Relevance here may be defined at the image retrieval level and typically includes ranking in top positions ones of database images with the same object instance as the one (object) in the query image. This important technology serves as a building block for popular applications such as image-based item identification (e.g., fashion items or products) and automatic organization of personal photos.

Most image retrieval approaches rely on computing image signatures (also called global feature descriptors herein) that are robust to viewpoint variations and other types of noise. Descriptors extracted by deep learned models using trained convolutional neural networks (CNNs) may outperform some keypoint-based methods. This good performance was enabled by the ability of deep learned models to leverage a family of loss functions well-suited to the ranking problem.

Image retrieval may rely on local patch descriptors (e.g. descriptors obtained through the scale-invariant feature transform, also called SIFT descriptors), aggregated using bag-of-words representations or another scheme to produce a global feature descriptor for each image, that could then be compared to one another in order to find the closest matches. Global feature descriptors directly extracted with CNNs may be used. While initial work used neuron activations extracted from off-the-shelf networks pre-trained for classification, networks can be trained specifically for the task of image retrieval in an end-to-end manner using a siamese network. Siamese networks may be artificial neural networks that use the same weights while working in tandem on two different input vectors to compute comparable output vectors. A loss function that optimizes ranking instead of classification may be leverages.

In the more restrictive context of patch retrieval, when training a network for outputting a local feature descriptor for each patch within an image, the mean average precision (mAP) metric may be optimized directly. A patch may be a small square of up to 100*100 pixels with limited visual content within an image and is therefore orders of magnitude smaller than the image in which it is embedded/included. While the average precision (AP) may not be a smooth and differentiable function, it may be approximated based on differentiable approximation to histogram binning. The use of histogram approximations to mAP is called listwise, as the loss function takes a variable (possibly large) number of examples at the same time and optimizes their ranking jointly.

In various implementations the AP loss function may be directly optimized. For example, the AP may be optimized through a loss-augmented inference problem under a structured learning framework using linear support vector machines (SVMs). This may also work with non-linear models. However, this may require a dynamic-programming approach which requires changes to the optimization algorithm itself and may complicate its general use.

SUMMARY

In order to overcome the above deficiencies, an approach to image retrieval is presented here that makes use of a listwise ranking loss function directly optimizing the mean average precision metric (abbreviated into mAP metric or simply mAP in the following disclosure) and outperforms prior art approaches. Further, the approach presented in this disclosure implements a multi-stage optimization scheme that makes training feasible on existing GPUs for arbitrary batch sizes, image resolutions and network depths.

For achieving these goals during the training phase of a convolutional neural network (CNN), the mAP metric is optimized directly to improve the ranking of images according to their similarity to a query image. For this purpose, the global feature descriptor of an input image is obtained directly as output of the CNN in response to the input image being fed into the CNN. The multi-dimensional space in which the global feature descriptors are defined may be called the embedding space, and the similarity between two images is computed on the basis of a distance between their global feature descriptors in the embedding space. As the AP loss function directly optimizes (a close approximation to) the mAP which is measured when evaluating an image retrieval system. As shown below, there is no need for pre-training or hard-negative mining, and convergence is much faster.

In a feature, a computer-implemented method of performing image retrieval is provided. The method includes: obtaining a query image; computing a global feature descriptor of the query image by inputting the query image into a trained CNN and obtaining the global feature descriptor in an embedding space as output, where learnable parameters of the convolutional neural network have been learned by training the CNN on a known batch of training images using a listwise ranking loss function directly optimizing a mean average precision ranking evaluation metric; computing a similarity between the query image and images that have been previously input into the CNN based on a distance in the embedding space between the global feature descriptor of the query image and the global feature descriptors of the images that have been previously input into the CNN; applying a ranking function to the images that have been previously input into the CNN to obtain a ranking of these images based on their similarity to the query image; selecting a set of images based on their similarity to the query image; and outputting a set of identifiers representative of the set of images.

In a feature, a computer-implemented method is provided for training learnable parameters of a CNN on a known batch of training images in a memory-efficient way through a three-stage algorithm. The method includes: computing a global feature descriptor for each image of the batch in the embedding space, but discarding intermediary tensors obtained during the computation of the global feature descriptor in the memory; computing a similarity between each pair of images in the batch, a listwise ranking loss function, and gradients of the loss function with respect to the global feature descriptors, without performing back-propagation of the gradients to the learnable parameters at that time; processing all the images of the batch by: selecting a given image of the batch, re-computing the corresponding global feature descriptor of the given image and the gradients of the loss function with respect to the learnable parameters of the CNN, and keeping the intermediary tensors in the memory, adding, for each given learnable parameter of the CNN, the contribution of the given image to an overall gradient of the loss function with respect to the given learnable parameter, and repeating the processing steps until it is determined that there is no remaining unselected image in the batch. Once it is determined that there is no remaining unselected image in the batch, back-propagating each overall gradient of the loss function to adapt the corresponding learnable parameter of the CNN, and repeating the method until it is determined that the listwise ranking loss function has reached a minimum.

In a feature, one or more computer-readable media storing thereon computer-executable instructions for the methods described herein are provided. When carried out by a processor, the computer-executable instructions cause the processor to perform the computer-implemented method of performing image retrieval described above and herein.

In a feature, one or more other computer-readable media storing thereon computer-executable instructions for the methods described herein are provided. When carried out by a processor, the computer-executable instructions cause the processor to perform the computer-implemented method described above and herein for training learnable parameters of a CNN on a known batch of training images in a memory-efficient way through a three-stage algorithm.

In a feature, an apparatus comprising processing circuitry is provided, where the processing circuitry is configured to perform the computer-implemented method of performing image retrieval described above.

In a feature, an apparatus comprising processing circuitry is provided, where the processing circuitry is configured to perform the computer-implemented method described above for training learnable parameters of a CNN on a known batch of training images in a memory-efficient way through a three-stage algorithm.

In a feature, a computer-implemented method of performing image retrieval includes: by one or more processors, obtaining a query image from a client device; by the one or more processors, generating a global feature descriptor of the query image by inputting the query image into a convolutional neural network (CNN) and obtaining the global feature descriptor in an embedding space as an output of the CNN, where parameters of the CNN are learned during training of the CNN on a batch of training images using a listwise ranking loss function and optimizing a quantized mean average precision ranking evaluation metric; by the one or more processors, determining similarities between the query image and other images based on distances in the embedding space between the global feature descriptor of the query image and global feature descriptors of the other images, respectively; by the one or more processors, ranking the other images based on the similarities between the query image and the other images, respectively; by the one or more processors, selecting a set of the other images based on the similarities between the query image and the other images; and by the one or more processors, transmitting a set of identifiers representative of the set of the other images to the client device.

In further features, the CNN is a ResNet network and includes at least 20 convolutional layers.

In further features, the training images each include a resolution of at least 65000 pixels.

In further features, the training images each include a resolution of at least 1 Megapixel.

In further features, the query image includes a resolution of at least 65000 pixels.

In further features, the listwise ranking loss function is a loss function configured to optimize ranking during the training of the CNN, which takes a variable number of the training images at the same time and optimizes ranking of those training images jointly.

In further features, the listwise ranking loss function approaches a minimum value when the variable number of training images has been ranked correctly by the ranking function during the training.

In further features, training the CNN using the batch of training images.

In further features, the training of the CNN includes: obtaining the batch of training images; computing global feature descriptors for the training images in the embedding space by inputting the training images into the CNN and obtaining the global feature descriptors of the training images as outputs of the CNN, respectively; determining similarities between pairs of the training images based on distances between the global feature descriptors of the training images of the pairs, respectively; ranking the training images based on the similarities; evaluating a quality of the ranking using an average precision ranking evaluation metric including a non-differentiable indicator function; reformulating the average precision ranking evaluation metric by performing histogram binning and quantization to produce a quantized average precision metric; determining a mean of the quantized average precision metric over the batch of training images; for each given parameter of the CNN, adapting the given learnable parameter of the CNN by back-propagating a gradient of the mean of the quantized average precision metric with respect to the given learnable parameter; determining whether the listwise ranking loss function has converged on a minimum value based on the mean of the quantized average precision metric; and ending the training when the listwise ranking loss function has converged.

In further features, the method further includes continuing the training when the listwise ranking loss function has not converged.

In further features, the method further includes determining that the listwise ranking loss function has converged when one minus the mean of the quantized average precision is a maximum value.

In further features, reformulating the average precision ranking evaluation metric includes replacing the indicator function in the average precision ranking evaluation metric by a quantization function including a set of triangular kernels each centered around a bin center of a histogram binning.

In further features: similarities between pairs of the training images are predetermined and stored; and the evaluating the quality of the ranking includes computing an average precision of the ranking relative to the predetermined similarities between the training images.

In further features, computing the average precision includes setting the average precision equal to a sum over all of the training images of a precision at rank k multiplied by an incremental recall from ranks k-1 to k, where the precision at rank k is a proportion of relevant ones of the training images found in the k first indexes of the ranking, and the incremental recall is the proportion of relevant ones of the training images found at rank k out of a total number of relevant ones of the training images.

In further features, computing global feature descriptors for the training images in the embedding space by inputting the training images into the CNN and obtaining the global feature descriptors of the training images as outputs of the CNN, respectively, includes discarding intermediate tensors obtained during the computation of the global feature descriptors.

In further features: (1) determining gradients of the loss function with respect to the global feature descriptors, without performing back-propagation of the gradients to the parameters of the CNN; (2) processing all the training images by: (a) selecting one of the training images; (b) re-computing the global feature descriptor of the one of the training images and the gradients of the loss function with respect to the parameters of the CNN and maintaining the intermediary tensors in memory; (c) for each of the parameters of the CNN, adding a contribution of the one of the training images to an overall gradient of the loss function with respect to that one of the parameters; repeating (a)-(c) until all of the training images have been selected; and ending the processing when all of the training images have been selected; (3) after the processing has ended, adapting the parameters of the CNN by back-propagating each overall gradient of the loss function; and repeating (1)-(3) until it is determined that the listwise ranking loss function has converged.

In further features, the selecting a set of images comprises selecting a predetermined number of the other images that are most similar to the query image based on their similarities.

In further features, the transmitting a set of identifiers includes transmitting the set of identifiers representative of the set of the other images to the client device in a ranked order according to the similarities in decreasing order.

In a feature, a computer-implemented method for training learnable parameters of a convolutional neural network (CNN) using a batch of training images includes: (1) by one or more processors, computing a global feature descriptor for each of the training images in the embedding space; (2) by the one or more processors, discarding from memory intermediary tensors obtained during the computation of the global feature descriptors; (3) by the one or more processors, determining similarities between each pair of the training images, a listwise ranking loss function, and gradients of the listwise ranking loss function with respect to the global feature descriptors, without performing back-propagation of the gradients to the learnable parameters; (4) processing all the images of the batch by: (a) selecting a given one of the training images; (b) re-computing the global feature descriptor of the one of the training images and the gradients of the listwise ranking loss function with respect to the learnable parameters of the CNN, and maintaining the intermediary tensors in the memory; (c) for each learnable parameter of the CNN, adding the contribution of the one of the training images to an overall gradient of the listwise ranking loss function with respect to that learnable parameter; (d) repeating steps (a)-(c) until each of the training images has been selected; and (e) ending the processing when each of the training images has been selected; (5) after the ending of the processing, back-propagating each overall gradient of the listwise ranking loss function to adapt the learnable parameters of the CNN; and (6) repeating (1)-(5) until it is determined that the listwise ranking loss function has reached a minimum value.

In a feature, an image retrieval system includes: one or more processors; and memory including code that, when executed by the one or more processors, perform functions including: obtaining a query image from a client device; generating a global feature descriptor of the query image by inputting the query image into a convolutional neural network (CNN) and obtaining the global feature descriptor in an embedding space as an output of the CNN, where parameters of the CNN are learned during training of the CNN on a batch of training images using a listwise ranking loss function and optimizing a quantized mean average precision ranking evaluation metric; determining similarities between the query image and other images based on distances in the embedding space between the global feature descriptor of the query image and global feature descriptors of the other images, respectively; ranking the other images based on the similarities between the query image and the other images, respectively; selecting a set of the other images based on the similarities between the query image and the other images; and transmitting a set of identifiers representative of the set of the other images to the client device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The accompanying drawings are incorporated into and form a part of the specification for the purpose of explaining the principles of the embodiments. The drawings are not to be construed as limiting the embodiments to only the illustrated and described embodiments of how they can be made and used. Further features and advantages will become apparent from the following and more particularly from the description of the embodiments, as illustrated in the accompanying drawings, wherein.

DETAILED DESCRIPTION

Figure 1:
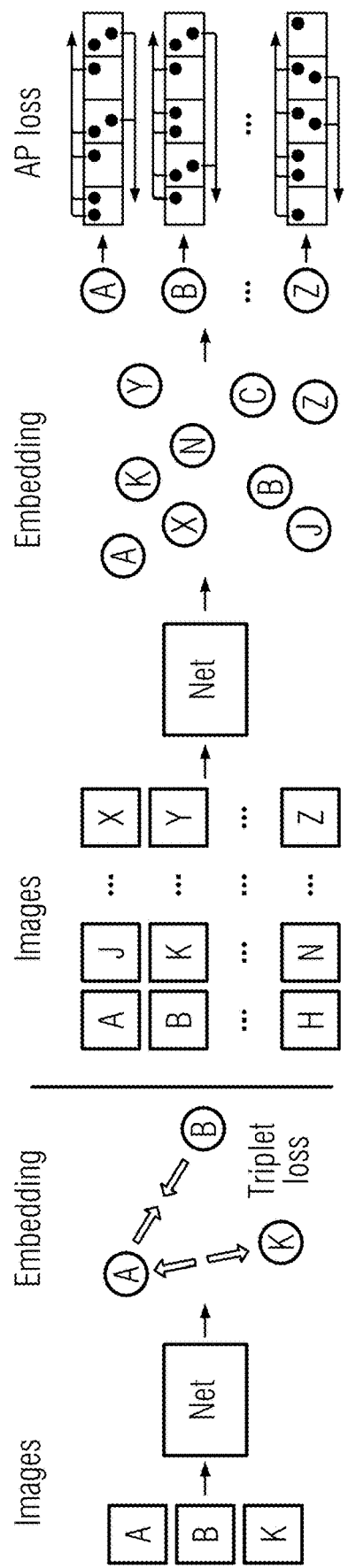
FIG. 1 illustrates the differences between using a local ranking loss function calculated based on an input of a triplet of images into the CNN (on the left side) versus using a listwise ranking loss function calculated based on an input of a large number of images into the CNN for training the CNN (on the right side)

A loss function based on average precision had not been implemented for the general case of convolutional neural networks (CNNs) trained with arbitrary learning algorithms. A new approach is needed in the context of image retrieval, where additional hurdles must be cleared because, in particular, the images are orders of magnitude bigger than the patches.

Described herein are systems and methods for image retrieval. For purposes of explanation, numerous examples and specific details are set forth in order to provide a thorough understanding of the described embodiments. Embodiments as defined by the claims may include some or all of the features in these examples alone or in combination with other features described below, and may further include modifications and equivalents of the features and concepts described herein. The illustrative embodiments will be described with reference to the drawings wherein like elements and structures are indicated by like reference numbers.

Image retrieval can be seen as a learning to rank problem. In this framework, the task is to determine in which order elements from the training set should appear. This task is solved using metric learning combined with an appropriate ranking loss function. In machine learning, a loss function (also called a cost function, or simply loss) is a function that maps an event or values of one or more variables onto a real number representing a cost associated with the event.

In order to obtain a CNN able to rank images according to their similarity, which can then be used for image retrieval, the CNN must first be trained. The training phase of the CNN aims at optimizing internal, learnable parameters of the CNN by training it on a set of images for which the expected result is known. In this case, that is the similarity between each pair of images of the set is known in terms of binary ground-truth labels for each pair of images, as explained in more detail below.

For this purpose, each image of the training set is input in the CNN, which outputs a vector value called a global feature descriptor of the image within a multi-dimensional space (also called the embedding space). A distance can be defined between any pair of global feature descriptors in the embedding space, according to any suitable distance metric, such as the Euclidean distance metric. Based on this distance, it is possible to define a similarity between pairs of images, where the similarity between two images decreases when the distance between them increases.

If an image of the set is chosen as starting point (corresponding to the query image for which a user may want to find similar images using the CNN once trained, all the images of the training set can be ranked in terms of decreasing similarity with respect to the chosen image. A chosen loss function can then be applied to the ranking for evaluating the efficiency (or degree of validity) of this ranking, based on the known similarities between each pair of images. The better the ranking obtained by the CNN is, the smaller will be the result of the loss function.

The aim of the training phase may be to modify internal, learnable parameters of the CNN to minimize the result of the loss function. This optimization of the loss function (which converges towards a minimum) is rendered possible by the back-propagation of so called loss gradients, which are obtained from the partial derivatives of the loss function with respect to the learnable parameters of the CNN. These loss gradients are back-propagated to the respective learnable parameters in that they are used to modify (or adapt or update) the learnable parameters to perform better at the next iteration of the training phase. At the next iteration, the CNN may output global feature descriptors of the images computed with the help of the modified learnable parameters, and these global feature descriptors may be better suited for ranking the images, leading to a better evaluation of the ranking obtained by the CNN (i.e., to a lower value of the loss function) and to a smaller adaptation of the learnable parameters at the next back-propagation of the loss gradients, until the loss function converges towards a minimum (e.g., less than a predetermined value) and adaptation of the learnable parameters can be stopped. Once the loss function has converged, the CNN has been successfully trained, and the (trained) CNN can be used to perform image retrieval.

Performing image retrieval includes receiving a query image, computing a global feature descriptor based on the query image, computing the similarities between the query image and other images for which a global feature descriptors have already been obtained (e.g., using the chosen distance metric in the embedding space mentioned above), and then ranking the other images in decreasing order of similarity with respect to the query image.

The ranking loss function may be a pairwise or a tuple-wise (e.g., triplet-based, n-tuple-based) ranking loss functions, which may be referred to as local loss functions because they act on a fixed and limited number of examples before computing the gradient. This may involve subsampling a small set of images, verifying that they locally comply with the ranking objective, performing a model update of the learnable parameters if they do not, and repeating these steps until convergence. In other words, the training involves repeatedly sampling random and difficult pairs or triplets of images, computing the loss function, and back-propagating its gradients.

Compared to classification losses, ranking-based loss functions directly optimize for the end task. This enforces intra-class discrimination and more fine-grained image representations. However, properly optimizing a local loss can be challenging. First, it is unclear if the essential loss that is being minimized is well aligned with standard evaluation metrics such as mean average precision (mAP). Second, the total number of possible pairs or triplets, for instance, increases quadratically or cubically with the size of the datasets, but only an unknown fraction of the pairs or triplets may be useful to the optimization. This total number largely may exceed in practice the allowable training time. Thus, the available information may not be fully exploited during training. Multiple complicated steps may be performed to obtain good results, such as pre-training for classification, combining multiple losses, and using complex hard-negative mining strategies (i.e., biasing the sampling of image pairs by mining hard or semi-hard negative examples). These engineering heuristics may be complicated to implement and tune. Mining hard examples may be time consuming. Also, local loss functions may only optimize an upper bound on the true ranking loss. As such, the minimum of the loss may not actually correspond to the minimum of the true ranking loss.

The present application involves a ranking loss function called a listwise ranking loss function that directly optimizes mAP, such as illustrated in FIG. 1. As mentioned above, listwise loss functions allow reformulation of AP using histogram binning. AP may normally non-smooth and not differentiable, and may not be directly optimized in gradient-based frameworks. However, histogram binning (or soft-binning) may be differentiable and may be used to replace the non-differentiable sorting operation in the AP, making it amenable to deep learning.

The present application involves an image retrieval approach based on a CNN directly trained for optimizing a quantized version of mAP called $mAP_Q$. The approach described herein may have better performance and fast training than other approaches while removing the need for costly pre-training and hard-negative mining. The approach described herein may outperform other approaches in terms of optimization of the loss function in common retrieval benchmarks, as will be shown below.

Image retrieval is different than patch retrieval. To be able to train a network with large batches of high-resolution images that considerably exceed the memory of a graphics processing unit (GPU), the chain-rule may be utilized, as will be described below. This allows to make use of batches (sets) of training images of arbitrary size with images of arbitrary resolutions for a network of arbitrary depth, regardless of the available GPU memory.

Thus, the training of the present application spares time (i.e., can be completed faster) and is more computationally efficiently than other approaches. The trained CNNs performing image retrieval may have a higher mean average precision than other approaches, so they are at least statistically more similar and/or better ranked than the ranked sets of images provided by other approaches.

The following sections introduce the mathematical framework of the AP-based listwise ranking loss function and the adapted training procedure adopted for the case of high-resolution images.

Definitions

First, some mathematical notations are introduced. Let $\mathcal{I}$ denote the space of images used for training a convolutional neural network (CNN), such as a deep feedforward network (DFN). Let S denote the unit hypersphere in D-dimensional space, $\mathcal{S} = \{x | \mathbb{R}^D | \|x\|=1\}$. A global feature descriptor for each image is obtained by inputting the images of I one-by-one into the CNN $f_\Theta: \mathcal{I} \to \mathcal{S}$, where $\Theta$ represents the learnable parameters of the CNN. It is assumed that $f_\Theta(\cdot)$ includes an $L_2$-normalization output layer so that the embedding (or global feature descriptor) of an image $I_i$, which is given by $d_i = f_\Theta(I_i)$, has unit norm. The similarity between two images can be evaluated in the embedding space (which is the multi-dimensional space in which the global feature descriptors are defined) using the cosine similarity:

$$\text{sim}(I_i, I_j) = d_i^T d_j [-1, 1] \quad \text{(Eq. 1)}$$

The goal may be to train the learnable parameters $\Theta$ of the CNN to rank, for each given query image $I_q$, its similarity to every image from a database $\{I_i\}_{1 \leq i \leq N}$ of size N. After computing the global feature descriptors associated with all images by a forward pass in the CNN, the similarity sim $(I_q, I_i) = S_i^q$ of each database image to the query image is efficiently measured in the embedding space using Eq. 1, for all i in $\mathcal{N} = \{1, 2, \ldots, N\}$. Database images can then be sorted according to their similarities in decreasing order.

Let $R: \mathcal{N}^N \times \mathbb{R} \to \mathcal{N}$ denote the ranking function, where $R(S^q, i)$ is the index of the i-th highest value of $S^q$. By extension, $R(S^q)$ denotes the ranked list of indexes for the database. The quality of the ranking $R(S^q)$ can then be evaluated with respect to the ground-truth image relevance, which is the above mentioned known similarity between each pair of images of the training set, denoted by the binary ground-truth labels $Y^q$ in $\{0,1\}^N$, where $Y_i^q$ is 1 if $I_i$ is similar (or "relevant") to $I_q$ and 0 otherwise.

Ranking evaluation is performed with one of the information retrieval (IR) metrics, such as average precision (AP), F-score, and discounted cumulative gain (DSG). IR metrics are used to assess how well the search results satisfy the user's query intent. This is rendered possible through the fact that the images of the batch used during the training phase are known and that their respective similarities are known through the above mentioned ground-truth labels.

One of the IR metrics, called precision, may refer to the fraction of the images retrieved that are relevant to the user's information need. Another IR metric, called recall, may refer to the fraction of the images relevant (or similar) to the query that are successfully retrieved. Both precision and recall are single-value metrics based on the whole list of images returned by the system. For systems that return a ranked sequence of images, it is desirable to also consider the order in which the returned images are presented. By computing a precision and recall at every position in the ranked sequence of images, one can plot a precision-recall curve, plotting precision p(r) as a function of recall r. Average precision (AP) computes the average value of p(r) over the interval from r=0 to r=1. That is, the area under the precision-recall curve. This integral may be determined as a finite (cumulative) sum over every position in the ranked sequence of documents.

AP may be a good metric for IR when the ground-truth labels are binary, as is the case for $Y_i^q$, as defined above. In contrast to other ranking metrics such as recall or F-score, AP may not depend on a threshold, rank position, or number of relevant (or similar) images. Thus, AP may be simpler to employ and better at generalizing for different queries. AP can be written as a function of $S^q$ and $Y^q$:

$$AP(S^q, Y^q) = \Sigma_{k=1}^N P_k(S^q, Y^q) \Delta r_k(S^q, Y^q) \quad \text{(Eq. 2)}$$

where $P_k$ is the precision at rank k, i.e. the proportion of relevant items in the k first indexes, which is given by:

$$P_k(S^q, Y^q) = \frac{1}{k} \sum_{i=1}^k \sum_{j=1}^N Y_j^q \mathbb{1}[R(S^q, i) = j] \quad \text{(Eq. 3)}$$

$\Delta r_k$ is the incremental recall from ranks k−1 to k, i.e., the proportion of the total $N^q = \sum_{i=1}^{N} Y_i^q$ relevant items found at rank k, which is given by:

$$\Delta r_k(S^q, Y^q) = \frac{1}{N^q} \sum_{j=1}^{N} Y_j^q 1[R(S^q, k) = j] \quad \text{(Eq. 4)}$$

and 1[•] is the indicator function.

Learning with Average Precision (AP)

The learnable parameters of $f_\Theta$ may be trained (e.g., by one or more processors) using stochastic optimization such that they maximize AP on the training set. However, this may be difficult for the AP formulation above because of the presence of the indicator function 1[•]. Specifically, the function R↦1[R=j] includes derivatives with respect to R equal to zero for all R≠0, and its derivative is undefined at R=0. This derivative may thus provide no information for optimization.

According to the present application, a listwise ranking loss function developed for histograms is used to overcome the above. The training of the CNN is performed with a relaxation of the AP, the relaxation performed by replacing the indicator function by a function δ, whose derivative can be back-propagated to adapt the learnable parameters of the CNN, where δ soft-assigns similarity values into a fixed number of bins.

Quanitization Function

For a given positive integer M, the interval [−1,1] is partitioned into M−1 equal-sized intervals, each of measure $$\Delta = \frac{2}{M-1}$$

and limited (from right to left) to bin centers $\{b_m\}_{1 \leq m \leq M}$, where $b_m = 1 - (m-1)\Delta$. This approach may be referred to as histogram binning. In Eq. 2, precision and incremental recall are calculated at every rank k in {1, . . . , N}. The first step of the relaxation is to, instead, compute these values at each bin:

$$P_m^{bin}(S^q, Y^q) = \frac{\sum_{m'=1}^{m} \sum_{i=1}^{N} Y_i^q 1[S_i^q \in \bar{b}_{m'}]}{\sum_{m'=1}^{m} \sum_{i=1}^{N} 1[S_i^q \in \bar{b}_{m'}]} \quad \text{(Eq. 5)}$$

$$\Delta r_m^{bin}(S^q, Y^q) = \frac{\sum_{i=1}^{N} Y_i^q 1[S_i^q \in \bar{b}_m]}{N^q} \quad \text{(Eq. 6)}$$

where the interval $\bar{b}_m = [\max(b_m - \Delta, -1), \min(b_m + \Delta, 1))]$ denotes the m-th bin.

The second step is to use a soft assignment as replacement of the indicator function. This is achieved by using the function $\delta: \mathbb{R} \times \{1, 2, \ldots, M\} \to [0,1]$ such that each δ(•,m) is a triangular kernel centered around $b_m$ and width 2Δ, such that $$\delta(x, m) = \max\left(1 - \frac{|x - b_m|}{\Delta}, 0\right) \quad \text{(Eq. 7)}$$

where δ(x, m) is a soft binning of x that approaches the indicator function $1[x \in \bar{b}_m]$ when M→∞ while being differentiable with respect to x:

$$\frac{\partial \delta(x, m)}{\partial x} = -\frac{\text{sign}(x - b_m)}{\Delta} 1[|x - b_m| \leq \Delta] \quad \text{(Eq. 8)}$$

By expanding the notation, $\delta(S^q, m)$ is a vector in $[0,1]^N$ that indicates the soft assignment of $S^q$ to the bin $\bar{b}_m$.

Hence, the quantization $\{\delta(S^q, m)\}_{i=1}^{N}$ of $S^q$ is a smooth replacement of the indicator function. This allows recomputation of the approximations of the precision and of the incremental recall as functions of the quantization, as presented previously in Eq. 3 and Eq. 4. Thus, for each bin m, the quantized precision $\hat{P}_m$ and incremental recall $\Delta \hat{r}_m$ are computed as:

$$\hat{P}_m(S^q, Y^q) = \frac{\sum_{m'=1}^{m} \delta(S^q, m')^\top Y^q}{\sum_{m'=1}^{m} \delta(S^q, m')^\top 1} \quad \text{(Eq. 9)}$$

$$\Delta \hat{r}_m(S^q, Y^q) = \frac{\delta(S^q, m)^\top Y^q}{N^q}, \quad \text{(Eq. 10)}$$

and the resulting quantized average precision, denoted by $AP_Q$, is a smooth function with respect to $S^q$, given by:

$$AP_Q(S^q, Y^q) = \sum_{m=1}^{M} \hat{P}_m(S^q, Y^q) \Delta \hat{r}_m(S^q, Y^q) \quad \text{(Eq. 11)}$$

Figure 2:
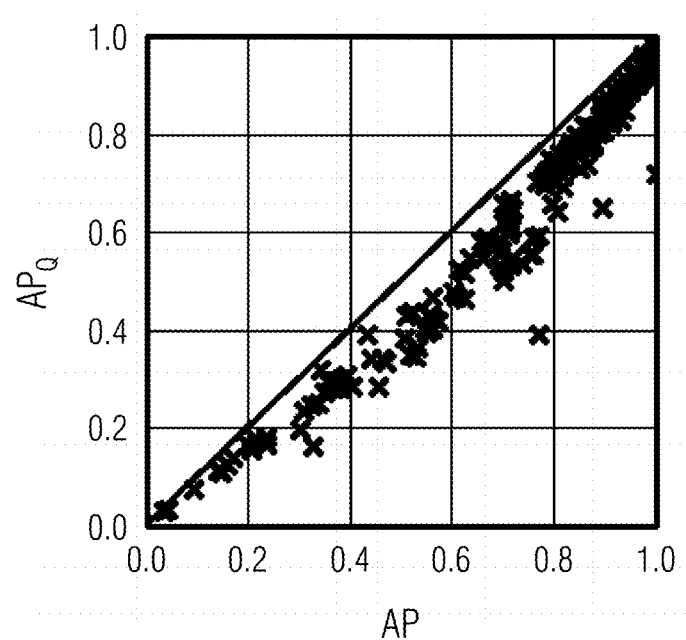
FIG. 2 is a scatter plot of the average precision (AP) versus the quantized version of the AP ($AP_Q$) used for a known set of images called $\mathcal{R}$ Paris.

The quality of the approximation of $AP_Q$ can be observed in FIG. 2, which shows a scatter plot of AP versus $AP_Q$ for all queries of the training (e.g., $\mathcal{R}$Paris) dataset, on which a correlation of circa 0.98 between them is visible.

Training Procedure

The training procedure and the loss function are defined as follows. Let $\mathcal{B} = \{I_1, \ldots, I_B\}$ denote a batch of images with labels $[y_1, \ldots, y_B] \in \mathbb{N}^B$, and $D = [d_1, \ldots, d_B] \in \mathcal{S}^B$ their corresponding global feature descriptors. During each training iteration, the mean of the values of $AP_Q$ over the batch (called $mAP_Q$) is computed. Each of the batch images is considered as a potential query image and is compared to all other batch images. The similarity scores for the query image $I_i$ are denoted by $S_i \in [-1,1]^B$, where $S_{ij} = d_i^T d_j$ is the similarity of the query image $I_i$ with another one of the images $I_j$. Let $Y_i$ denote the associated binary ground-truth label, with $Y_{ij} = 1[y_i = y_j]$. The quantized mAP, denoted by $mAP_Q$, for this batch is given by:

$$mAP_Q(D, Y) = \frac{1}{B} \sum_{i=1}^{B} AP_Q(d_i^T D, Y_i) \quad \text{(Eq. 12)}$$

Since the mAP is to be maximized on the training set of images, the listwise ranking loss function is defined as:

$$L(D, Y) = 1 - mAP_Q(D, Y) \quad \text{(Eq. 13)}$$

For simplicity, the listwise ranking loss function defined here will sometimes be called loss function (or even loss).

Training for High-Resolution Images

In the context of patch retrieval, top performance may be reached for large batch sizes. In the context of image retrieval, the same approach may not be able to be applied directly. The memory occupied by a batch is several orders of magnitude larger then that occupied by a patch, making the backpropagation intractable on any number of GPUs. This is because (i) high-resolution images (e.g., of about 1 Megapixels or more, compared to 50×50 pixels for patches) are used to train the network (CNN), and (ii) the network used for image retrieval is much deeper than the ones used for patch retrieval. For example, ResNet-101 has 101 layers and around 44000 parameters are used for performing image retrieval in an exemplary implementation of this disclosure. By way of contrast, an L2-Net with 7 layers and around 26000 parameters may be used for patch retrieval.

Figure 3:
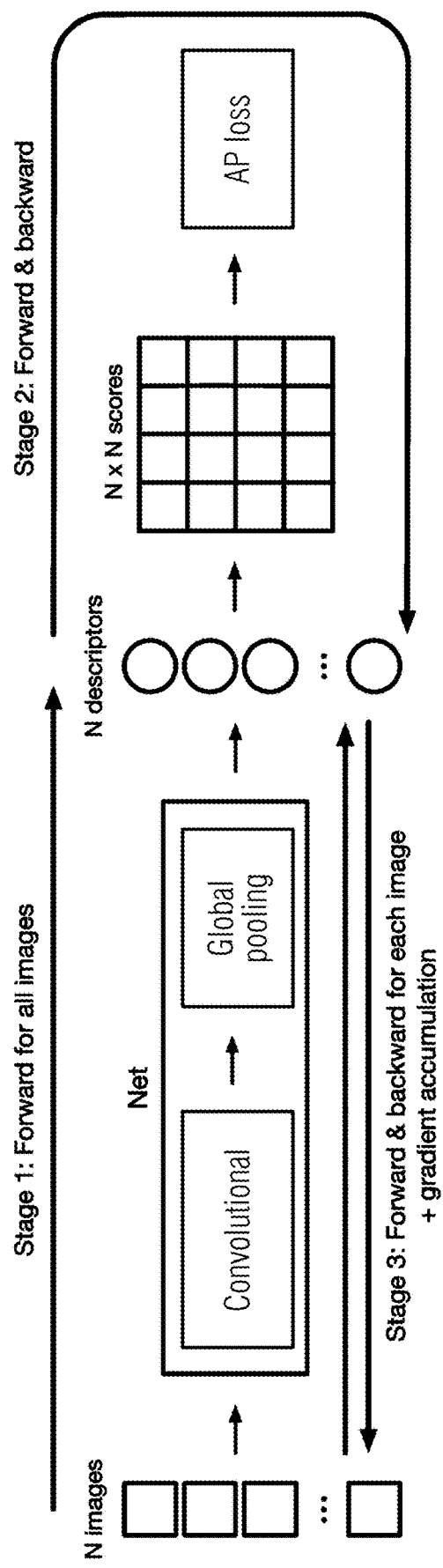
FIG. 3 illustrates an optimized algorithm for training a CNN over a large number of input images.

The chain rule ensures that each gradient (i.e., partial derivative) of the loss function with respect to one of the learnable parameters of the CNN (which have been back-propagated to the respective learnable parameters of the CNN to train the CNN) can be decomposed into a sum of sub-gradients, each sub-gradient being computed with respect to a single image of the batch. In an embodiment, an algorithm exploiting this chain rule is provided, that solves the memory issue and allows the training of a network of arbitrary depth, with arbitrary image resolution and batch size, without approximating the loss function defined above. The algorithm, consisting of three stages, is illustrated in FIG. 3 and detailed below.

During the first stage of training called an evaluation mode, the global feature descriptors of all training images of a batch of images are computed, but the intermediary tensors obtained during the computation (i.e. the tensors obtained at each internal node of the CNN) are discarded.

In the second stage of training, the score matrix S is computed (according to Eq. 1) as well as the loss function $\ell = L(D, Y)$, and the gradient of the loss function with respect to the global feature descriptors $$\frac{\partial \ell}{\partial d_i}$$

is also computed. However, no back-propagation of the gradients to the learnable parameters of the CNN is performed at that stage. This is the reason why the intermediary tensors can be discarded. Since all tensors considered are compact (the global feature descriptors and the score matrix), this operation consumes little memory.

During the third (last) stage of training, the global feature descriptors are recomputed, this time storing the intermediary tensors. This operation occupies a significant amount of memory, but it may be performed image by image. Given the global feature descriptor $d_i$ for the image $I_i$ and the gradient of the loss function with respect to this global feature descriptor $$\frac{\partial \ell}{\partial d_i},$$

the back-propagation through the network can be performed. Thus, each gradient with respect to a given learnable parameter is accumulated, one image at a time, before finally updating the network learnable parameters with the help of the corresponding gradients, as shown in the last step of the algorithm below. This updating step corresponds to the above mentioned back-propagation, through which the learnable parameters of the CNN are iteratively adapted until the loss function converges towards a minimum and the training phase is concluded.

The algorithm for efficient training of the gradients for an arbitrary number of images in the set (batch) of training images works as described by the following pseudo-code:

```
Inputs: training batch 𝓑 = {(I₁, y₁), ..., (I_B, y_B)}
for i in 1 ... B; do
    compute d_i ← f_Θ(I_i)
create D ← [d₁, ..., d_B] ∈ ℝ^{B×D}
create Y ∈ {0, 1}^{B×B} such that Y_{ij} = 1[y_i = y_j]
ℓ ← L(D, Y) # compute the loss compute  ∂ℓ/∂D ∈ ℝ^{B×D}  # with chain-rule init  ∂ℓ/∂Θ ← 0 for i in 1 ... B; do
    compute d_i ← f_Θ(I_i)
    compute  ∂d_i/∂Θ ← ∂/∂Θ f_Θ(I_i)
    accumulate  ∂ℓ/∂Θ ← ∂ℓ/∂Θ + ∂d_i/∂Θ (∂ℓ/∂D)_i  # with chain-rule update Θ ← Θ − γ ∂ℓ/∂Θ  # optimizer step
```

Implementation Example

First, the different datasets used in experiments performed according to an embodiment will be discussed. Then, key parameters of the disclosed embodiments are identified and compared to other results obtained in the field.

Datasets

The Landmarks dataset includes 213,678 images divided into 672 classes. This dataset has been created semi-automatically by querying a search engine and may include mislabeled images. An automatic cleaning process can be performed to clean this dataset (e.g., by removing mislabeled images), and the result may be called the Landmarks-clean dataset. The (clean) dataset includes 42,410 images and 586 landmarks and is used to train the CNN in the experiments discussed below.

Figure 4:
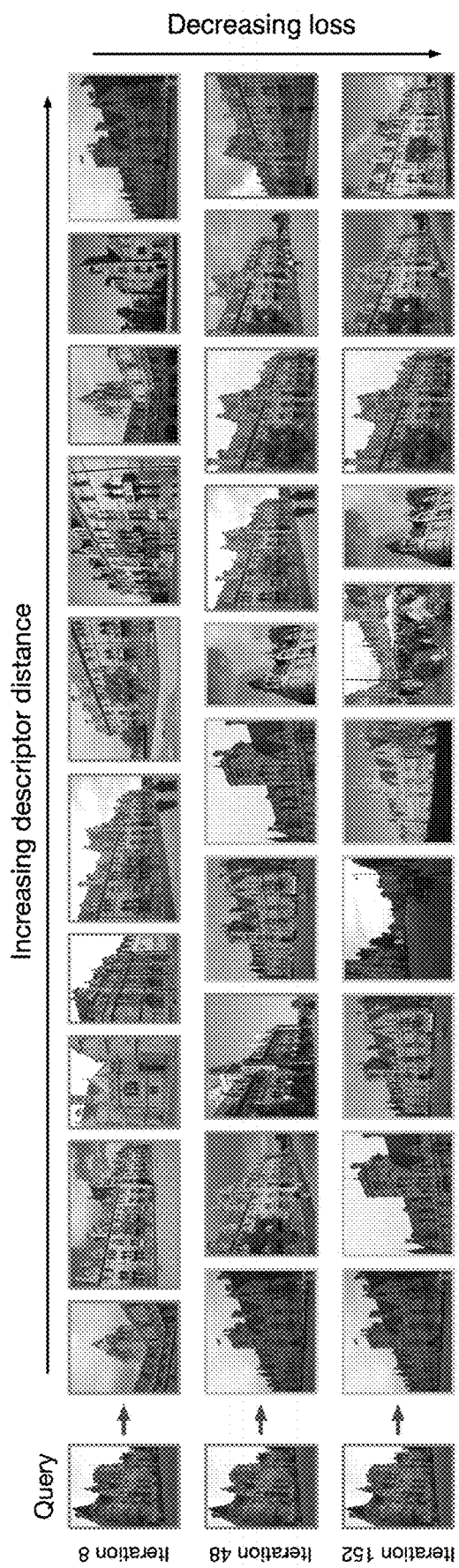
FIG. 4 illustrates the evolution of a training process over time through examples of answers to an image query obtained with the trained CNN with the known set of images $\mathcal{R}$ Oxford after three given numbers of iterations (8, 48 and 152 iterations)

The Revisited Oxford (ℛOxford) and Revisited Paris (ℛParis) datasets include 4,993 and 6,322 images, respectively, with 70 additional images for each that are used as queries (see FIG. 4 for example queries). These images are further labeled (categorized) according to the difficulty in identifying which landmark they depict (e.g., Easy, Hard, Unclear, and Negative). These categories are then used to determine three evaluation protocols for these datasets:

Easy: Easy images are considered positive, Hard and Unclear are ignored.
Medium: Easy and Hard images are considered positive, Unclear are ignored.
Hard: Hard images are considered positive, Easy and Unclear are ignored.

Optionally, a set of 1 million distractor images (ℜ1M) can be added to each dataset to make the task more challenging (e.g., realistic). Since these new datasets are essentially updated versions of the original Oxford and Paris datasets, with the same characteristics but more reliable ground-truth labels, these revisited versions have been used in the experiments discussed below.

Implementation Details and Parameter Study

The CNN is trained using a stochastic gradient on the Landmarks-clean dataset. In all experiments discussed below, a ResNet-101 CNN pre-trained on ImageNet is used as a backbone (i.e., a starting state of the CNN before beginning the training phase). ResNet-101 is a specific instantiation of a CNN architecture making use of 101 convolution layers. The original final layer of the ResNet-101 CNN, however, (which was specific to a classification algorithm) is replaced by a generalized-mean pooling (GeM) layer. The GeM layer is a particular type of layer which performs global feature pooling (i.e., it transforms an image of variable width and height into a fixed size vector). The GeM layer contains a single trainable parameter which is trained through back-propagation of the gradients, as the rest of the network parameters.

The above ResNet-101 network is trained according to the Adam optimization. Unless stated otherwise, the following parameters are used: the weight decay (which specifies how the learnable parameters are updated during back-propagation) is set to $10^{-6}$, and the set of training images is augmented by generating additional training images through data augmentation (e.g., by applying e.g., color jittering, random scaling, rotation and cropping). For example, one training image may be transformed by applying some color noise to it (which may be referred to as color jittering), which makes a new, very similar image. Training images are cropped to a fixed size of 800×800 pixels, but during testing, the original images (unscaled and undistorted) are fed into the (trained) CNN.

Using multiple scales may be used to improve test performance. This may be performed by feeding the input image several times in the CNN, each time with a different scaling (resolution) to get multiple different global representations which are complementary. These multiple representations may be averaged to get an improved final image representation.

However, using multiple scales at test time may not lead to any significant improvement. Operating at a single scale makes the global feature descriptor extraction significantly faster (e.g., 3 times faster) than other methods for a comparable network backbone.

The choice of other parameters will now be discussed based on different experimental studies.

Learning Rate

The highest learning rate that does not result in divergence may give best results. A linearly decaying learning rate starting from $10^{-4}$ and decreasing to 0 after 200 iterations has been used.

Score Quantization

Figure 5:
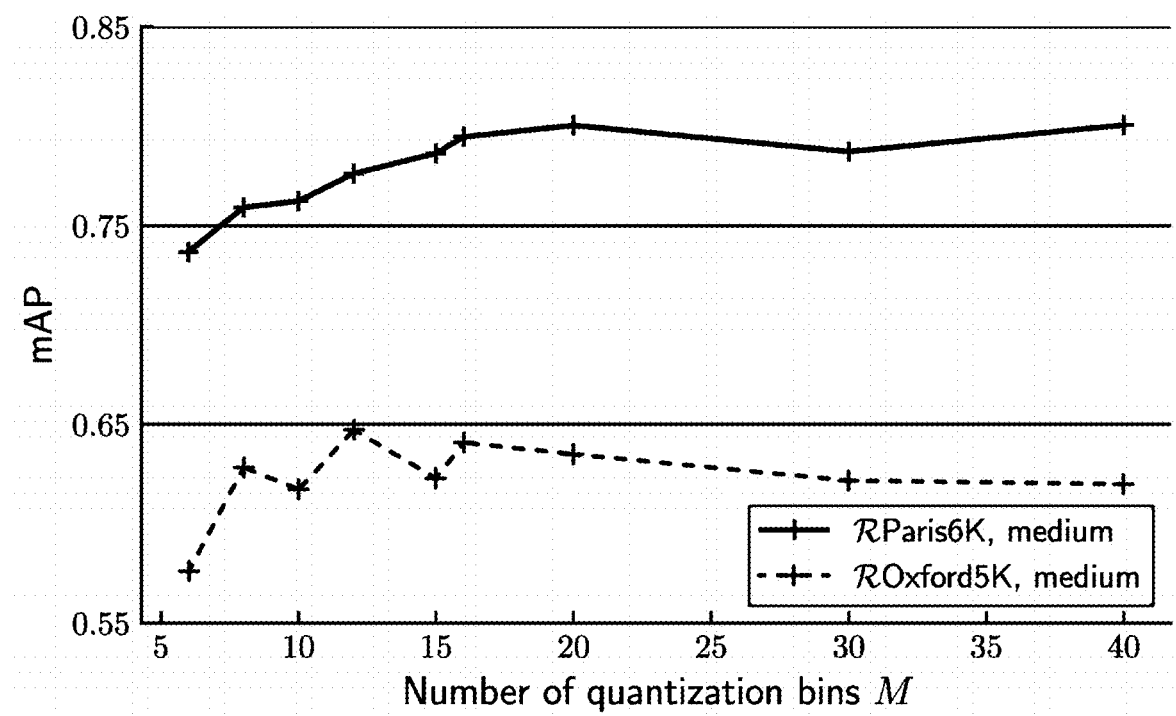
FIG. 5 is a plot of $mAP_Q$ as a function of the number of quantization bins.

The $AP_Q$ loss function depends on the number of quantization bins M in Eq. 7. The performance achieved for different values of M is plotted in FIG. 5, which shows that this parameter may have little impact on the performance of the loss function for training the CNN. M=20 quantization bins have been used in all other experiments.

Batch Size

Figure 6:
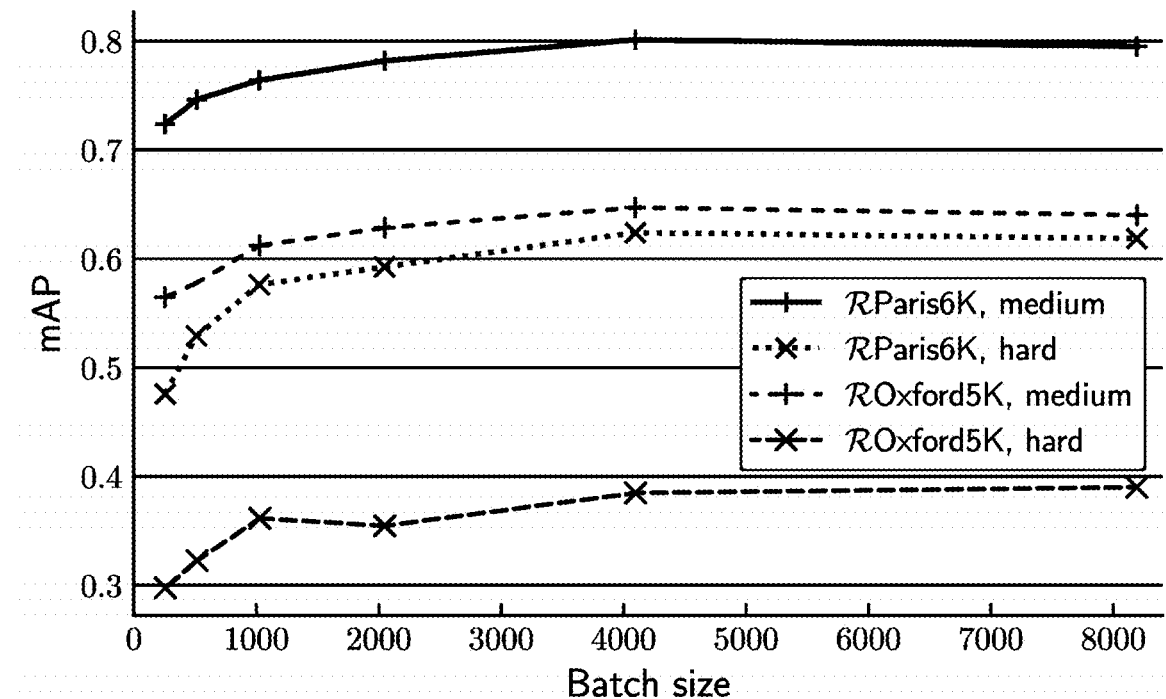
FIG. 6 is a plot of $mAP_Q$ as a function of the batch size.

The experimental results show that larger batch sizes lead to better results, as illustrated in FIG. 6. The performance saturates beyond 4096, and the training may slow as well. Accordingly, batches of 4096 images are used in all subsequent experiments.

Class Sampling

Figure 7:
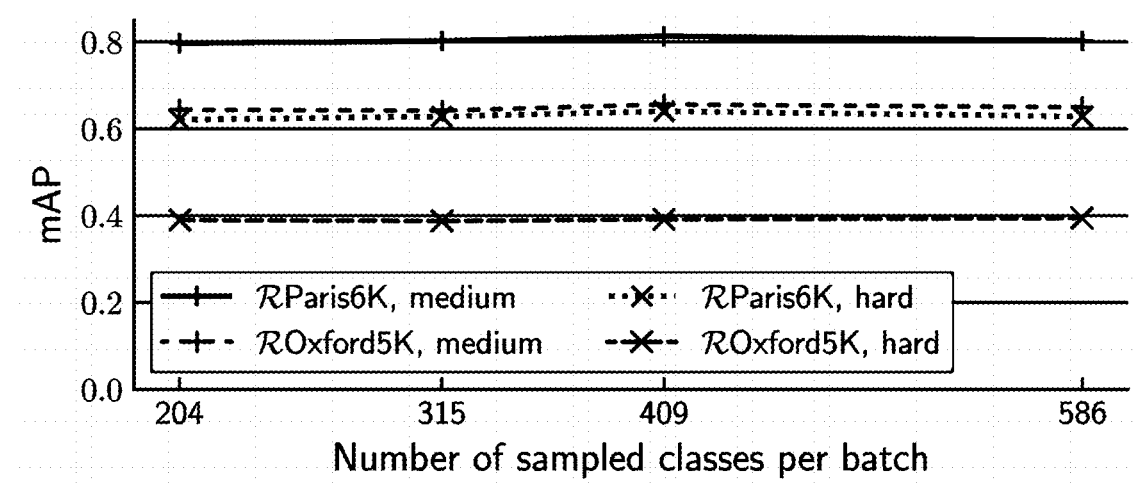
FIG. 7 is a plot of $mAP_Q$ as a function of the number of sampled classes per batch.
Figure 8:
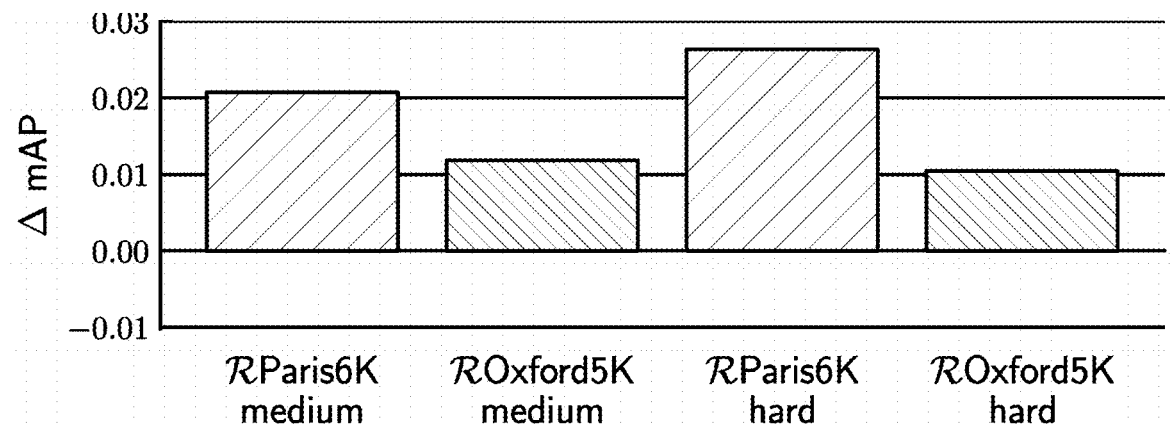
FIG. 8 is a histogram showing the improvement in terms of $mAP_Q$ obtained for four distinct batches of known images by balancing the AP weights when computing the AP loss function such that all classes are weighted equally within a batch.

Each batch is constructed by sampling random images from each dataset class. All classes are therefore represented in a single batch. Experiments showed that sampling the classes may not lead to any difference, as illustrated by FIG. 7. Due to the dataset imbalance, certain classes are constantly over-represented at the batch level. To counterbalance this situation, a weight has been introduced in Eq. 12 to weight equally all classes inside a batch. Two CNNs have been trained with and without this weighting. The results are presented in FIG. 8. The improvement in terms of mean average precision with class weighting is around +2% and shows the importance of this balancing.

Tie-Aware AP

A bias can occur in the ranking of the images according to their similarities if ties are present in the embedding space. In this context, ties relate to images having global feature descriptors in the embedding space that are at the same distance to the query image and therefore equally similar to the query image. In such a case, an uncertainty occurs regarding how these images should be ranked in the final result. In order to minimize this bias, the present application involves a tie-aware version of the $AP_Q$ loss function (called $AP_T$) developed for the specific case of ranking integer-valued Hamming distances and also applied to real-valued distances. However, for implementing these tie-aware versions of $AP_Q$, approximations are necessary. A simplified tie-aware AP loss function has also been used and its efficiency has been compared to the one of $AP_Q$. The $AP_T$ is computed in a way similar to $AP_Q$ in Eq. 11, but the precision is replaced by a more accurate approximation:

$$\hat{P}_m(S^q, Y^q) = \frac{1 + \delta(S^q, m)^\top Y^q + 2\sum_{m'=1}^{m-1} \delta(S^q, m')^\top Y^q}{1 + \delta(Sq, m)^\top 1 + 2\sum_{m'=1}^{m-1} \delta(S^q, m')^\top 1}, \quad \text{(Eq. 14)}$$

Figure 9:
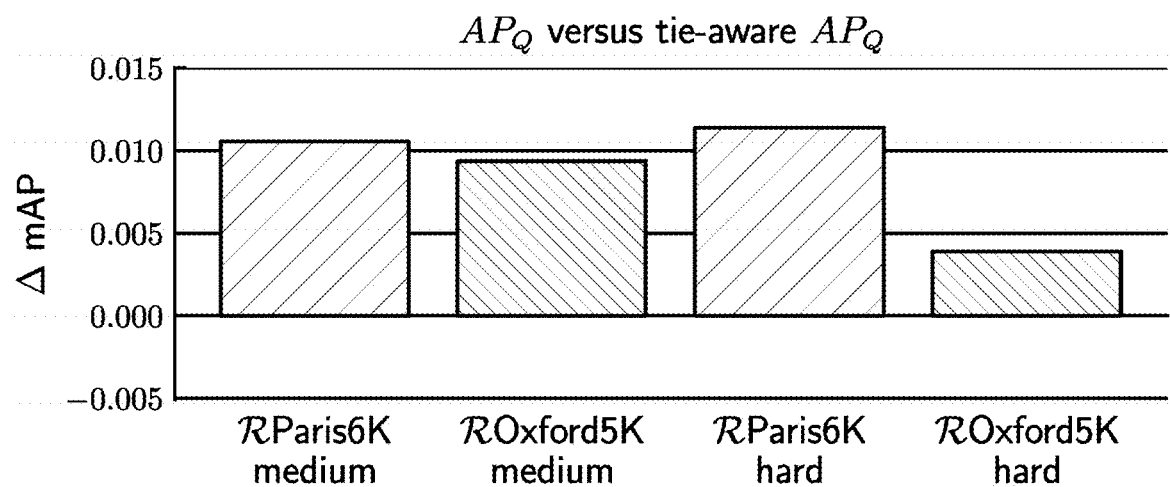
FIG. 9 is a histogram showing the improvement in terms of mAP obtained for four distinct batches of known images when $AP_Q$ is used when compared to a tie-aware version of AP called $AP_T$.

The absolute difference in terms of mean average precision is presented in FIG. 9, which shows that the $mAP_Q$ loss function, derived from the definition of AP, may outperform the tie-aware formulation. This may be due to the fact that the tie-aware formulation used in practical implementations is in fact an approximation of a tie-aware AP. Accordingly, the $mAP_Q$ loss function has been used in all subsequent experiments.

Descriptor Whitening

Descriptor whitening may be used improve the performance of global feature descriptors. Descriptor whitening includes multiplying a global feature descriptor (extracted e.g., from the Landmarks dataset described above) by a matrix obtained using principal component analysis (PCA) on the image representations of the training dataset. The PCA returns the eigenvalues (D×1 vector) and the eigenvectors (D×D matrix). Instead of using only the D×D eigenvector matrix, in one embodiment, a PCA matrix M=diagonal(sqrt(eigenvalues))*eigenvectors, where diagonal( ) creates a diagonal matrix from a vector and sqrt( ) computes the element-wise square-root. The global feature descriptors are then normalized at test time using the computed PCA. The above defined square-rooted PCA may be more effective. Descriptor whitening has been used in all subsequent experiments.

Embodiments

Embodiments will now be described in detail in relation to the above and by reference to the drawings of FIGS. 10 to 12. In the following embodiments, reference is made to training and use of a CNN. According to example embodiments, a deep feedforward network (DFN) or a convolutional forward network (CFN) can be used for the training.

Figure 10:
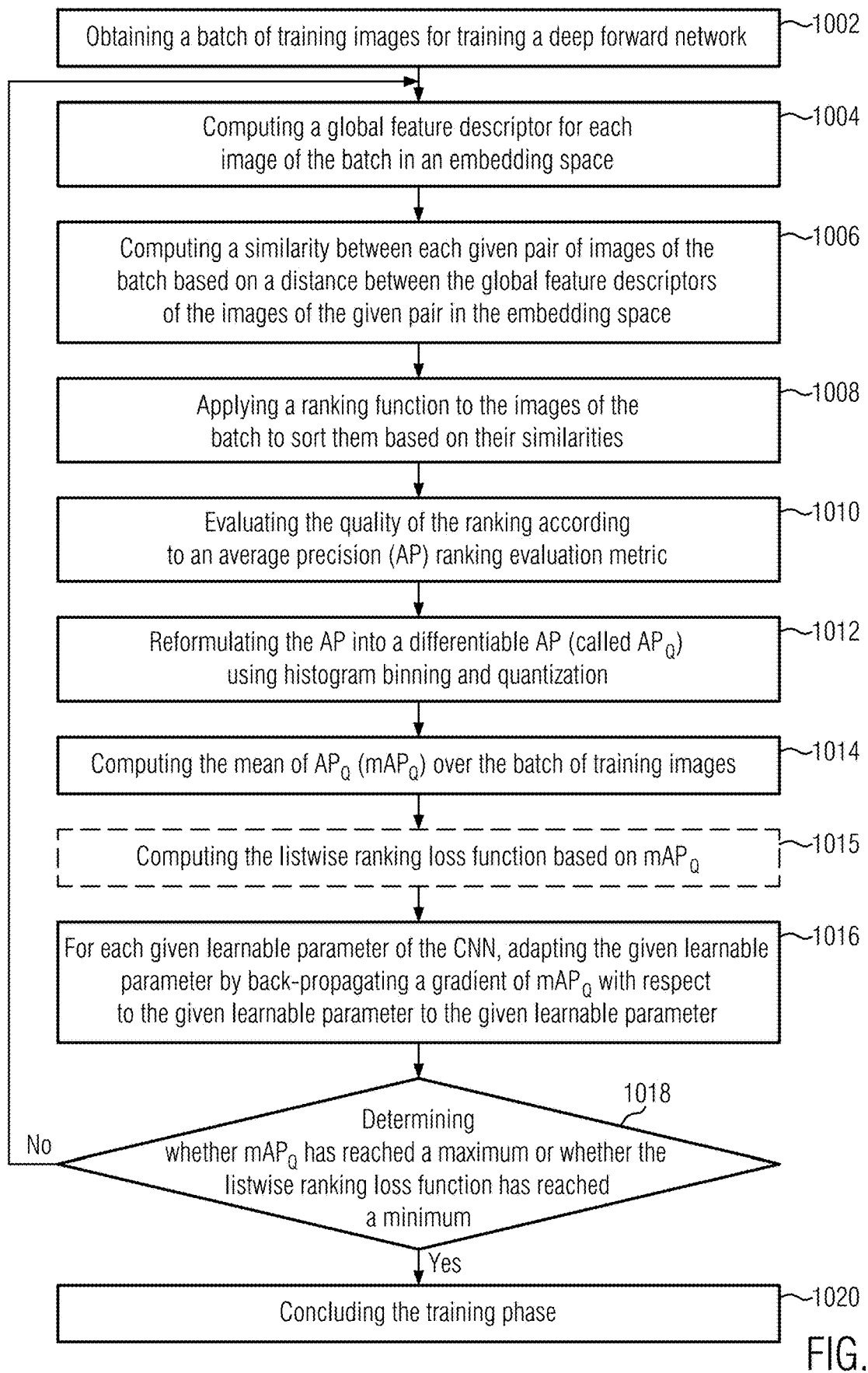
FIG. 10 is a functional block diagram illustrating a method for training the CNN.

FIG. 10 is a functional block diagram illustrating a computer-implemented method for training a CNN according. The method may be performed by one or more processors. The method begins at 1002, at which a batch (or a set) of training images is obtained. Obtaining the training images may include receiving the training images from a user dealing with the training phase of the CNN or from a memory location (e.g. a local or remote computing system, a local or remote database, a cloud storage or any other memory location known in the field) on which they are stored. The training images can be retrieved by a user or automatically retrieved from memory. The training images used for the training phase are known, and in particular their respective similarities are known, thereby providing the ground-truth image relevance mentioned above. The ground-truth image relevance includes for example in a set of known binary ground-truth labels (e.g., one label for each pair of images of the batch), each label of a given pair of images informing whether these images are similar (in which case, the label is equal to 1) or not (in which case, the label is equal to 0). For example, the received training images can be one of the datasets of known images mentioned above, such as $\mathcal{R}$Paris or $\mathcal{R}$Oxford. In an embodiment, the training images of the batch are high-resolution images of more than 1 Megapixels.

At 1004, a global feature descriptor is computed in an embedding space for each image of the received batch of training images. This is achieved by inputting each image of the batch into the CNN to be trained and obtaining the corresponding global feature descriptor as output of the CNN. As explained above, the global feature descriptors are vectors defined in a multi-dimensional space called the embedding space, and each global feature descriptor describes uniquely the corresponding image in the embedding space. As mentioned above, in an embodiment, the CNN can be a ResNet CNN, for example a ResNet-101, which has 101 convolution layers. However, the CNN may include 20 or more convolutional layers, and may include at least 100 convolutional layers. Further, the original CNN (i.e., the CNN with the original values of its learnable parameters before the training phase begins) can be pretrained on ImageNet. Alternatively, a CNN trained for classification tasks in another manner can be used as original CNN.

At 1006, a similarity is computed between each given pair of images of the batch of training images based on a distance between the global feature descriptors in the embedding space. A distance metric can be used to compute these similarities. For example, an Euclidean metric can be used to determine the distance between two global feature descriptors in the embedding space, and the similarity between two images can be a value proportional to the Euclidean distance between the corresponding global feature descriptors. However, another measure of the similarity can be used, based on a metric indicative of the distance between global feature descriptors in the embedding space.

At 1008, a ranking function R is applied to the training images of the batch to sort them based on their similarities. For example, each image of the batch is considered to be an initial query image, and the remaining images of the batch are ranked (or sorted) according to their similarities to the query image. The images of the batch can be ranked by decreasing or by increasing similarity. An example of the ranking obtained in this step for a given query image can be found in FIG. 4 discussed above, at different training stages of the CNN (i.e., at different numbers of iterations of the training method illustrated in FIG. 10).

At step 1010, the quality of the obtained rankings is evaluated, for example, using an average precision (AP) ranking evaluation metric. As relative similarities between the images of the batch of training images are predetermined (e.g., through the set of binary ground-truth labels, as explained above), evaluating the quality of a ranking may be performed by computing an average precision of the ranking compared to the predetermined relative similarities between the images of the batch. In an embodiment, the AP may be determined as a (mathematical) sum over all images of the product of a precision at rank k times an incremental recall from ranks k-1 to k, where the precision at rank k is the proportion of relevant images found in the k first indexes of the ranking, and the incremental recall is the proportion of relevant images found at rank k out of a total of relevant images. Details regarding this step and the formulation of AP is provided above in the definitions section.

At 1012, the AP is reformulated into a differentiable AP that may be referred to as a quantized AP (or $AP_Q$) using histogram binning and quantization. Reformulating the AP ranking evaluation metric into $AP_Q$ includes replacing the indicator function in the AP ranking evaluation metric by a quantization function δ being a set of triangular kernels each centered around a bin center $b_m$ of an histogram binning. Details on this step are provided above in the quantization function section.

At 1014, the mean of $AP_Q$ ($mAP_Q$) over the batch of training images is computed. Details regarding this step are provided above in the training procedure section.

Optionally, at 1015, the listwise ranking loss function L(D,Y) as defined above in Eq. 13 is computed based on $mAP_Q$. The listwise ranking loss function is a loss function adapted to optimize ranking during the training phase of the CNN, which takes a variable number of training images at the same time and optimizes their ranking jointly. The listwise ranking loss function is a minimal value when the variable number of training images has been ranked correctly by the ranking function during the training phase. The listwise ranking loss function may increase when the variable number of training images has not been ranked correctly by the ranking function during the training phase.

At 1016, each given learnable parameter of the CNN is adapted through back-propagation of the gradient of $mAP_Q$ with respect to the given learnable parameter. This includes updating the learnable parameters of the CNN.

At 1018, it is determined whether the listwise ranking loss function based on $mAP_Q$ has converged toward or to a minimum value, such as to less than a predetermined minimum value (or equivalently whether $mAP_Q$ converges toward or to a maximum value, such as greater than a predetermined maximum value). This may mean that the ranking function optimally ranks the training images and obtains a result similar to the expected result (complying with the known ground-truth image relevance). For example, this determination can be performed by comparing the newly computed value of $mAP_Q$ in 1014 with the previous value of $mAP_Q$ (or the respective new and previous values of the corresponding loss function) and determining whether these values are equal or at least whether a difference between the new value and the previous value is less than a predetermined threshold value. Another suitable method for determining convergence can be used.

If it is determined that the listwise ranking loss function has converged towards or to a minimum value, the method ends at 1020 at which the training phase is concluded. The trained CNN can then be applied to image retrieval with any set of images, as will be described in detail in relation with FIG. 11. However, if it is determined that the listwise ranking loss function has not converged yet, the training steps 1004 to 1016 are repeated until convergence is achieved.

It is noted that though the method of the example of FIG. 10 have been described in a given order, this order is not meant to be restrictive and a different order may be used. For example, the determining of 1016 could also be performed immediately after 1014 and a last adaptation of the learnable parameters could thereby be avoided in case convergence is achieved, since this last adaptation may not modify (or at least not substantially modify) the learnable parameters once convergence has been achieved.

Figure 11:
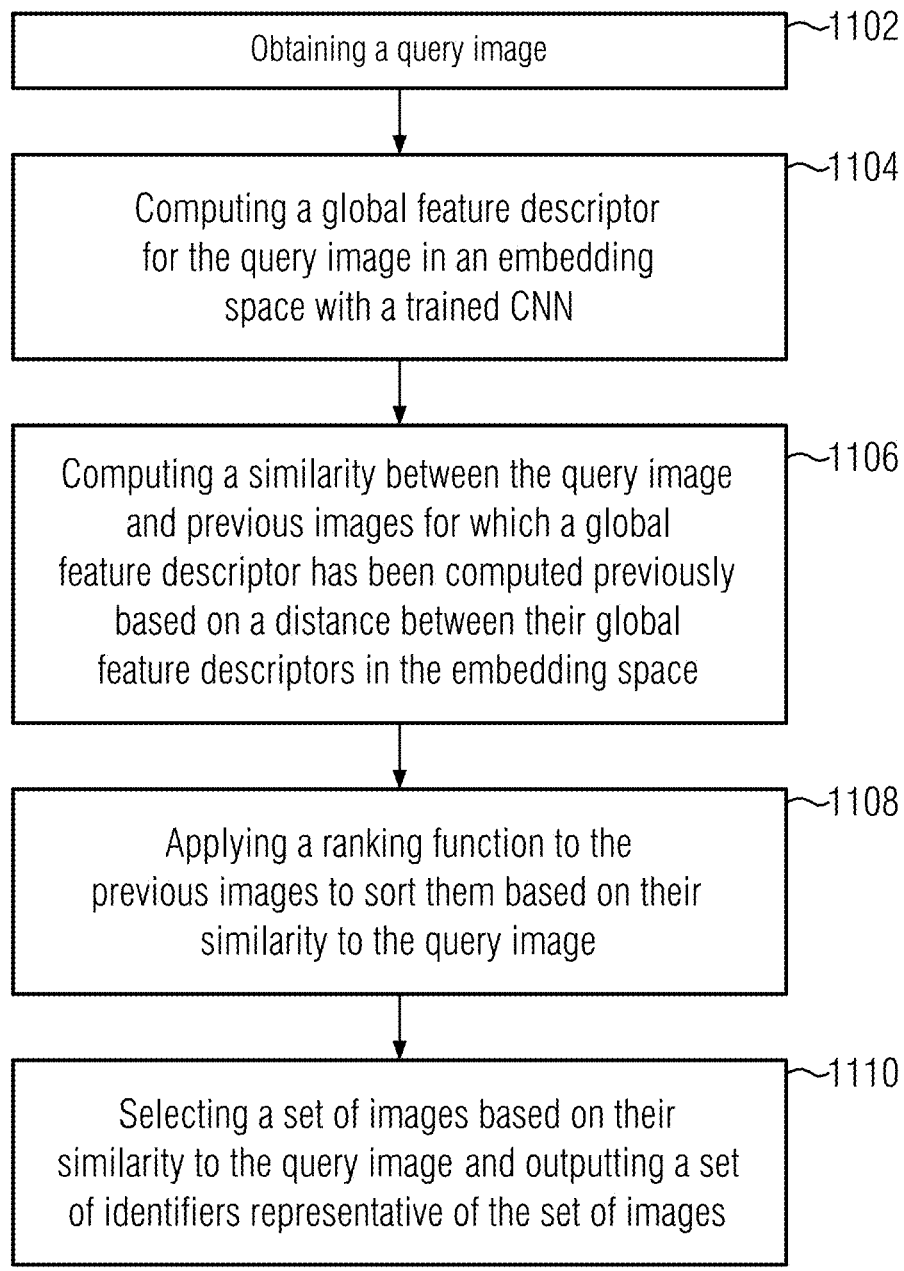
FIG. 11 is a functional block diagram illustrating a method for image retrieval in response to the reception of a query image.

FIG. 11 is a flowchart depicting an example method for image retrieval in response to the reception of a query image. The method for information retrieval may be performed by one or more processors. This method can be performed by applying the trained CNN (obtained at the end of the method of FIG. 10) to an unknown set of images distinct from the training batch of images after the training phase illustrated in 1020 of FIG. 10 has been concluded (e.g., after $mAP_Q$ has converged), which means that the learnable parameters of the CNN have been learned successfully and that the CNN is ready for image retrieval responsive to queries.

The steps performed for responding to a query image are at least in part similar to the steps performed during the training phase described in relation with FIG. 10, but without having to evaluate the ranking function anymore, nor having to adapt the learnable parameters of the CNN. Once the training phase has been successfully completed, the measure of similarities between the images based on the distances between their corresponding global feature descriptors in the embedding space is considered optimized. In other words, the function defining the global feature descriptor of an image, as encoded within the CNN (through the final values of its learnable parameters obtained at the end of the training phase), may be considered optimized for comparing input images and ranking them according to a similarity measure.

At 1102, a (potentially unknown) query image is obtained, such as from a client device or retrieved. This query image may be received from a client device or from another source, manually or automatically. Alternatively, the query image may be retrieved by automatically by programming means, such as an application executing on a client device. The source may be local or remote, and may be a database or another type of memory or another source from which an image can be digitalized. Alternatively, the source itself may be an application or any type of program code having access to images stored in memory. The query image may pertain to the batch of training images or may be another image that has never been input into the CNN before. The query image may be a high-resolution image of at least 65,000 pixels.

At 1104, the query image is input into the CNN which has been previously trained (e.g. according to the method of FIG. 10), and a corresponding global feature descriptor is output by the trained CNN based on the query image. The learnable parameters of the CNN have been learned by training the CNN on the batch of training images using a listwise ranking loss function directly optimizing a quantized mean average precision, $mAP_Q$, ranking evaluation metric.

At 1106, a similarity is measured between the query image and other images, such as other images previously input into the CNN, based on a distance in the embedding space between the global feature descriptor of the query image and the respective global feature descriptors of the other images.

At 1108, the other images are ranked based on their similarity to the query image, for example ranked by decreasing similarity (from highest similarly to lowest similarity).

At 1110, a set of images is selected based on the similarity of the images of the set to the query image and a set of identifiers representative of the set of images is output. The set of identifiers may identify the images themselves or other data associated with the images such as a class (e.g., for image categorization/classification), an object such as a person's name (e.g., for facial/retinal recognition), or a location (e.g., from location data associated with metadata of images) etc. Optionally, these identifiers and/or the selected set of images may then be transmitted to the client device (e.g., via a network) from which the query was received or to another target device or target location in response to the query. For example, all the images previously input into the CNN, or only a subset of the images for which the similarity to the query image is above a predetermined threshold, can be transmitted. Alternatively, only a predetermined number of the most similar images could be transmitted. The images can be ranked, for example, by decreasing similarity. Alternatively, embodiments are also contemplated where the resulting set of images provided to the user is not ranked, or ranked by increasing similarity, or according to any other criterion independent of the similarity. The items transmitted to a device can be displayed, such as on a display of or connected to the device.

Figure 12:
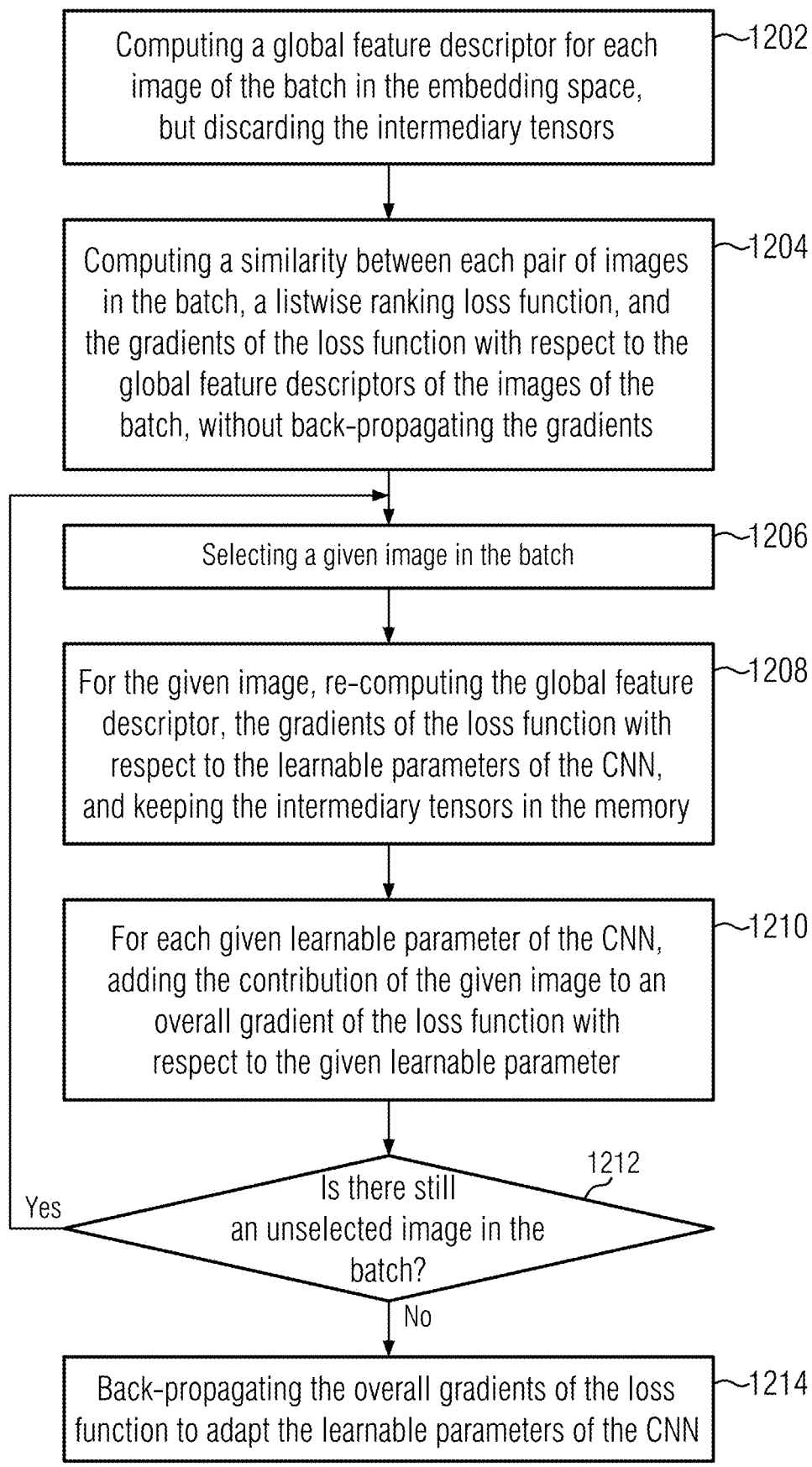
FIG. 12 is a functional block diagram illustrating a method for optimizing the training of the CNN over a large number of input images.

FIG. 12 is a flowchart depicting a method for optimizing an iteration of the training of the CNN over a large number of input images. The method may be executed by one or more processors. The example of FIG. 12 follows the description above in the training for high-resolution images section that can be applied to implement 1004 to 1016 of the training phase of the CNN described above in relation with FIG. 10, for adapting the learnable parameters of the CNN. This three-stage algorithm is optimized to spare memory and time, since in view of the fact that the CNN is trained with high-resolution images of arbitrary high size and resolution, computing the gradients of the loss function with respect to all the learnable parameters of the CNN over all the images of the training batch may be infeasible in practice. This method uses the chain rule in the computation of the gradients (in the second stage of the algorithm) in order to compute the gradients recurrently by successively adding the contribution of each given image to the gradients, one image at a time, thereby freeing the memory of the computations made for one image before treating the contribution of the next image to the gradients.

At 1202, the global feature descriptors of all the images of the training batch are computed, but all the intermediary tensors obtained during the computation may be discarded.

At 1204, the similarities between each pair of images in the batch are computed, as well as the listwise ranking loss function (or $mAP_Q$), and the gradients of the loss function (or of $mAP_Q$) with respect to the global feature descriptors of the images of the batch. However, no back-propagation of the gradients to adapt the learnable parameters is performed at this time.

A loop is initiated over the images in the batch through the determination, at 1212, whether there are still one or more images in the batch that have not been treated yet, and for each given image of the batch selected at 1206, the following steps are performed. First, at 1208, its global feature descriptor is recomputed, the gradients of the loss function (or $mAP_Q$) with respect to the learnable parameters of the CNN are computed, and this time the intermediary tensors obtained during the computation are kept in memory. Second, at 1210 for each learnable parameter of the CNN, a gradient is computed as follows: after an initialization of all gradients to zero before the first image is treated in the third stage, the contribution of the given image to this gradient is added to the previous value of this gradient. Once all the images of the batch have been treated one by one, the final gradients with respect to each learnable parameter have been fully computed and they can be back-propagated at 1214 to adapt the learnable parameters of the CNN.

1202 to 1214 are repeated over a number of iterations until convergence is achieved, e.g., until it is determined at 1018 of the training phase illustrated in FIG. 10 that either $mAP_Q$ has reached a maximum, or equivalently that the listwise ranking loss function has reached a minimum. In an embodiment, $mAP_Q$ is the mean over the batch of training images of a quantized average precision ranking evaluation metric, $AP_Q$, which is a quantized version of an average precision, AP, ranking evaluation metric that has been rendered differentiable using histogram binning and quantization.

As an improvement, at the end of 1202, the intermediary tensors of the last image that has been treated can be kept in memory and this image can be the first one to be selected in 1206, in order to avoid an unnecessary re-computation of the global feature descriptor of the last image.

The order and the number of the steps in the example of FIG. 12 are illustrative. The order and number of steps may be different. For example, the loop performed on the images of the batch can be implemented according to any alternative formulation.

Comparison

The results obtained with the above described model will now be compared. The top part of Table 1 summarizes the performance of the best-performing methods on the datasets listed above without query or database expansion. Notation may be used as this helps to clarify important aspects about each method. Generalized-mean pooling is denoted by GeM and the R-MAC pooling is denoted by R-MAC. The type of loss function used to train the model is denoted by CL for the contrastive loss, TL for the triplet loss, AP for the $AP_Q$ loss described above, and O if no loss is used.

Overall, the systems and methods described herein provide an improvement of 1% to 5% on all datasets and protocols. For example, the systems and methods described herein provide at least 4 points of improvement relative to the best reported results on the hard protocol of $\mathcal{R}$Oxford and $\mathcal{R}$Paris. This is remarkable since the systems and methods described herein use a single scale at test time (i.e., the original test images), whereas other manners may boost performance by pooling feature descriptors computed at several scales. In addition, the trained CNN described above does not undergo any special pre-training step (it has been initialized with ImageNet-trained weights). This is novel. Empirically it can be observed that the $AP_Q$ loss may render such pre-training stages obsolete. Finally, the training time is also considerably reduced according to the systems and methods described herein: training the described CNN from scratch takes a few hours on a single P40 GPU. Other types of training may be significantly longer.

Results with query expansion (QE) and database augmentation (DBA) are reported at the bottom of Table 1. The α-weighted versions with α=2 and k=10 nearest neighbors for both QE and DBA are used. The systems and methods described herein with QE outperform other methods using QE in 6 protocols out of 8. Using simple α-expansion based DBA, the systems and methods described herein may outperform a comparatively expensive diffusion-based augmentation scheme on the $\mathcal{R}$Oxford dataset by a large margin (+5% on the medium protocol, +9% on the hard protocol), while staying competitive on the $\mathcal{R}$Paris dataset.

The results obtained with the trained CNN described above are adequate. Even though the systems and methods described herein rely on global descriptors, hence lacking any geometric verification, the systems and methods described herein still perform suitably on the $\mathcal{R}$Oxford and $\mathcal{R}$Paris datasets without added distractors.

TABLE 1

All global representations are learned from a ResNet-101 backbone, with varying pooling layers and fine-tuning losses.

|  | Medium | | | | Hard | | | |
| --- | --- | --- | --- | --- | --- | --- | --- | --- |
|  | ℛOxf | ℛOxf + 1M | ℛPar | ℛPar + 1M | ℛOxf | ℛOxf + 1M | ℛPar | ℛPar + 1M |
| Local descriptors | | | | | | | | |
| HesAff-rSIFT-ASMK* + SP (Radenović et al. 2018) | 60.6 | 46.8 | 61.4 | 42.3 | 36.7 | 26.9 | 35.0 | 16.8 |
| DELF-ASMK* + SP (Noh et al. 2017) | 67.8 | 53.8 | 76.9 | 57.3 | 43.1 | 31.2 | 55.4 | 26.4 |
| Global representations | | | | | | | | |
| MAC(O) (Tolias, Sicre, and Jégou 2016) | 41.7 | 24.2 | 66.2 | 40.8 | 18.0 | 5.7 | 44.1 | 18.2 |
| SPoC(O) (Babenko and Lempitsky 2015) | 39.8 | 21.5 | 69.2 | 41.6 | 12.4 | 2.8 | 44.7 | 15.3 |
| CroW(O) (Kalantidis, Mellina, and Osindero 2016) | 42.4 | 21.2 | 70.4 | 42.7 | 13.3 | 3.3 | 47.2 | 16.3 |
| R-MAC(O) (Tolias, Sicre, and Jégou 2016) | 49.8 | 29.2 | 74.0 | 49.3 | 18.5 | 4.5 | 52.1 | 21.3 |
| R-MAC(TL) (Gordo et al. 2017) | 60.9 | 39.3 | 78.9 | 54.8 | 32.4 | 12.5 | 59.4 | 28.0 |
| GeM(O) (Radenović, Tolias, and Chum 2018) | 45.0 | 25.6 | 70.7 | 46.2 | 17.7 | 4.7 | 48.7 | 20.3 |
| GeM(CL) (Radenović, Tolias, and Chum 2018) | 64.7 | 45.2 | 77.2 | 52.3 | 38.5 | 19.9 | 56.3 | 24.7 |
| GeM(AP) [described embodiments] | 67.5 | 47.5 | 80.1 | 52.5 | 42.8 | 23.2 | 60.5 | 25.1 |
| Query expansion | | | | | | | | |
| R-MAC(TL) + αQE (Gordo et al. 2017) | 64.8 | 45.7 | 82.7 | 61.0 | 36.8 | 19.5 | 65.7 | 35.0 |
| GeM (CL) + αQE (Radenović, Tolias, and Chum 2018) | 67.2 | 49.0 | 80.7 | 58.0 | 40.8 | 24.2 | 61.8 | 31.0 |
| GeM (AP) [described embodiments] + αQE | 71.4 | 53.1 | 84.0 | 60.3 | 45.9 | 26.2 | 67.3 | 32.3 |
| Query and database expansion | | | | | | | | |
| R-MAC (TL) + DFS (Gordo et al. 2017) | 69.0 | 56.6 | 89.5 | 83.2 | 44.7 | 28.4 | 80.0 | 70.4 |
| GeM (CL) + DFS (Radenović, Tolias, and Chum 2018) | 69.8 | 61.5 | 88.9 | 84.9 | 40.5 | 33.1 | 78.5 | 71.6 |
| GeM (AP) [described embodiments] + αQE + αDBA | 75.3 | — | 86.9 | — | 53.8 | — | 73.4 | — |

Abbreviations: (O) no loss; (CL) fine-tuned with contrastive loss; (TL) fine-tuned with triplet loss; (AP) fine-tuned with mAP loss (according to the systems and methods described herein); (SP) spatial verification with RANSAC; (aQE) weighted query expansion); (DFS) query expansion with diffusion.

While some specific embodiments have been described in detail above, it will be apparent to those skilled in the art that various modifications, variations and improvements of the embodiments may be made in the light of the above teachings and within the content of the appended claims without departing from the intended scope of the embodiments. In addition, those areas in which it is believed that those of ordinary skill in the art are familiar have not been described herein in order not to unnecessarily obscure the embodiments described herein. Accordingly, it is to be understood that the embodiments are not to be limited by the specific illustrative embodiments, but only by the scope of the appended claims.

Although the above embodiments have been described in the context of method steps, they also represent a description of a corresponding component, module or feature of a corresponding apparatus or system.

Some or all of the method steps may be implemented by a computer in that they are executed by (or using) a processor, a microprocessor, an electronic circuit or processing circuitry.

The embodiments described above may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

Generally, embodiments can be implemented as a computer program product with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor. In a further embodiment, an apparatus comprises one or more processors and the storage medium mentioned above.

In a further embodiment, an apparatus comprises means, for example processing circuitry like e.g. a processor communicating with a memory, the means being configured to, or adapted to, perform one of the methods described herein.

A further embodiment comprises a computer having installed thereon the computer program or instructions for performing one of the methods described herein.

Figure 13:
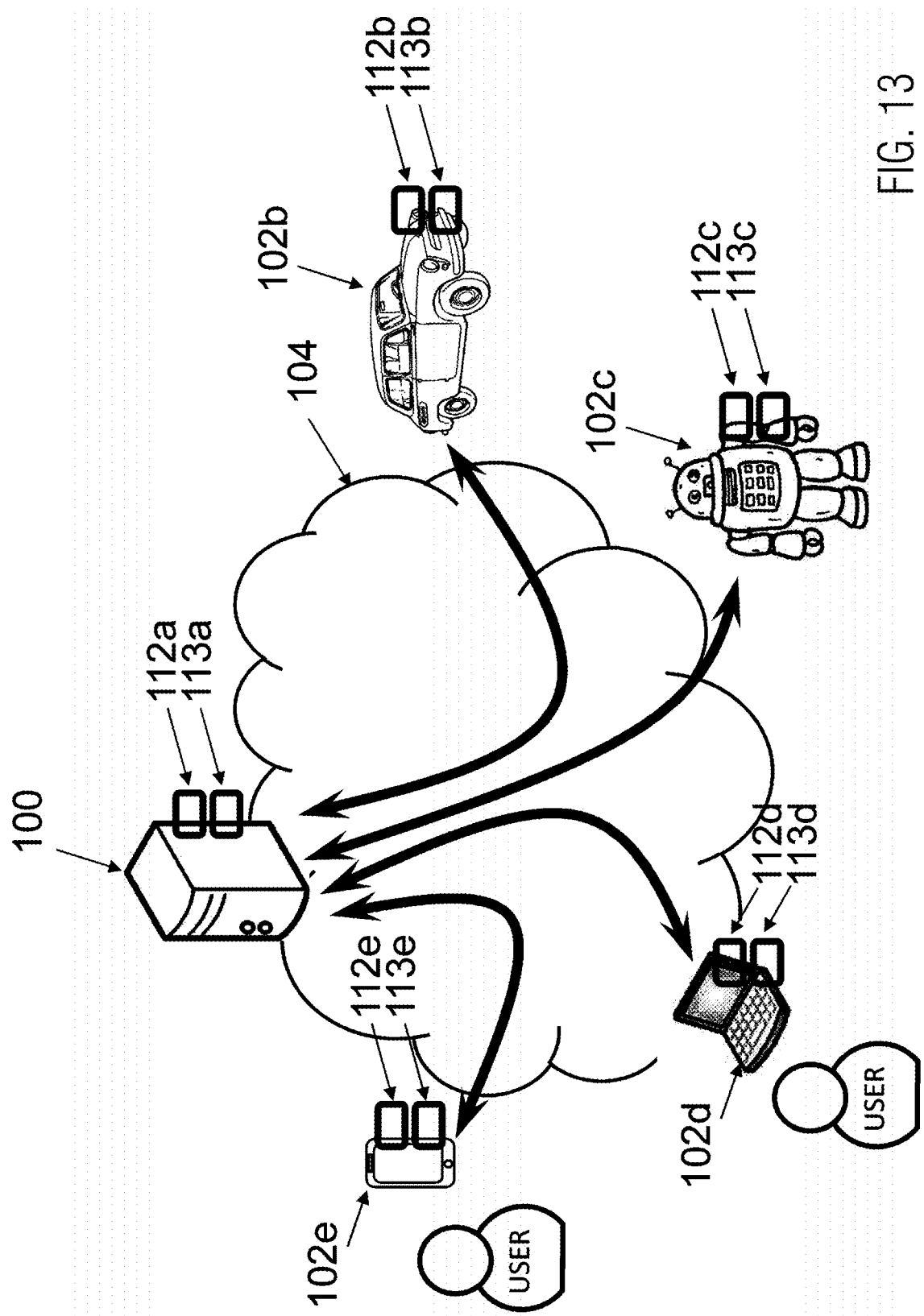
FIG. 13 illustrates an example of an architecture in which the disclosed methods may be performed.

The above-mentioned methods and embodiments may be implemented within an architecture, such as illustrated in FIG. 13, which includes server 100 and one or more client (user) devices 102 that communicate over a network 104. The network 104 may be wireless, wired, or a combination of wireless and wired networks. For example, the network 104 may include the Internet for data exchange. Server 100 and the client devices 102 include a data processor 112 (e.g., 112a, 112b, 112c, 112d, 112e) and memory 113 (e.g., 113a, 113b, 113c, 113d, 113e) such as a hard disk. The client devices 102 may be any device that communicates with server 100, including autonomous vehicle 102b, robot 102c, computer 102d, or cell phone 102e.

In one embodiment, the query image obtained in 1102 of the method of performing image retrieval corresponds to a query initiated by client device 102. The query is processed at server 100, which returns processed identifiers representative of the set of images to client device 102. In an alternate embodiment, the query can be processed at the client device 102 that initiated the query. The method for training learnable parameters of a CNN may also be performed at server 100 or in an alternate embodiment at a different server or in another alternate embodiment at the client device 102.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term code may include software, firmware, and/or microcode, and may refer to programs, routines, functions, classes, data structures, and/or objects. The term processor encompasses a single processor that executes some or all code. The term processor also includes multiple processors that execute some or all code from one or more sources. References to multiple processors encompass multiple processor circuits on discrete dies, multiple processor circuits on a single die, multiple cores of a single processor circuit, multiple threads of a single processor circuit, or a combination of the above.

The term memory refers to or is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer-implemented method of performing image retrieval, the method comprising:
   by one or more processors, obtaining a query image from a client device;
   by the one or more processors, generating a global feature descriptor of the query image by inputting the query image into a convolutional neural network (CNN) and obtaining the global feature descriptor in an embedding space as an output of the CNN,
   wherein parameters of the CNN are learned during training of the CNN on a batch of training images using a listwise ranking loss function and optimizing a quantized mean average precision ranking evaluation metric;
   by the one or more processors, determining similarities between the query image and other images based on distances in the embedding space between the global feature descriptor of the query image and global feature descriptors of the other images, respectively;
   by the one or more processors, ranking the other images based on the similarities between the query image and the other images, respectively;
   by the one or more processors, selecting a set of the other images based on the similarities between the query image and the other images; and
   by the one or more processors, transmitting a set of identifiers representative of the set of the other images to the client device.

2. The method of claim 1, wherein the CNN is a ResNet network and includes at least 20 convolutional layers.

3. The method of claim 1, wherein the training images each include a resolution of at least 65000 pixels.

4. The method of claim 1, wherein the training images each include a resolution of at least 1 Megapixel.

5. The method of claim 1, wherein the query image includes a resolution of at least 65000 pixels.

6. The method of claim 1, wherein the listwise ranking loss function is a loss function configured to optimize ranking during the training of the CNN, which takes a variable number of the training images at the same time and optimizes ranking of those training images jointly.

7. The method of claim 6 wherein the listwise ranking loss function approaches a minimum value when the variable number of training images has been ranked correctly by the ranking function during the training.

8. The method of claim 1 further comprising training the CNN using the batch of training images.

9. The method of claim 8 wherein the training of the CNN includes:
   obtaining the batch of training images;
   computing global feature descriptors for the training images in the embedding space by inputting the training images into the CNN and obtaining the global feature descriptors of the training images as outputs of the CNN, respectively;
   determining similarities between pairs of the training images based on distances between the global feature descriptors of the training images of the pairs, respectively;
   ranking the training images based on the similarities;
   evaluating a quality of the ranking using an average precision ranking evaluation metric including a non-differentiable indicator function;
   reformulating the average precision ranking evaluation metric by performing histogram binning and quantization to produce a quantized average precision metric;
   determining a mean of the quantized average precision metric over the batch of training images;
   for each given parameter of the CNN, adapting the parameter of the CNN by back-propagating a gradient of the mean of the quantized average precision metric with respect to the parameter;
   determining whether the listwise ranking loss function has converged on a minimum value based on the mean of the quantized average precision metric; and
   ending the training when the listwise ranking loss function has converged.

10. The method of claim 9 further comprising continuing the training when the listwise ranking loss function has not converged.

11. The method of claim 9, further comprising determining that the listwise ranking loss function has converged when one minus the mean of the quantized average precision is a maximum value.

12. The method of claim 9, wherein the reformulating the average precision ranking evaluation metric includes replacing the indicator function in the average precision ranking evaluation metric by a quantization function including a set of triangular kernels each centered around a bin center of a histogram binning.

13. The method of claim 9, wherein:
   similarities between pairs of the training images are predetermined and stored; and
   the evaluating the quality of the ranking includes computing an average precision of the ranking relative to the similarities between the training images.

14. The method of claim 13 where computing the average precision includes setting the average precision equal to a sum over all of the training images of a precision at rank k multiplied by an incremental recall from ranks k-1 to k, where the precision at rank k is a proportion of relevant ones of the training images found in the k first indexes of the ranking, and the incremental recall is the proportion of relevant ones of the training images found at rank k out of a total number of relevant ones of the training images.

15. The method of claim 9 wherein the computing global feature descriptors for the training images in the embedding space by inputting the training images into the CNN and obtaining the global feature descriptors of the training images as outputs of the CNN, respectively, includes discarding intermediate tensors obtained during the computation of the global feature descriptors.

16. The method of claim 9 further comprising:
(1) determining gradients of the loss function with respect to the global feature descriptors, without performing back-propagation of the gradients to the parameters of the CNN;
(2) processing all the training images by:
  (a) selecting one of the training images;
  (b) re-computing the global feature descriptor of the one of the training images and the gradients of the loss function with respect to the parameters of the CNN and maintaining intermediary tensors in memory;
  (c) for each of the parameters of the CNN, adding a contribution of the one of the training images to an overall gradient of the loss function with respect to that one of the parameters;
  repeating (a)-(c) until all of the training images have been selected; and
  ending the processing when all of the training images have been selected;
(3) after the processing has ended, adapting the parameters of the CNN by back-propagating each overall gradient of the loss function; and
repeating (1)-(3) until it is determined that the listwise ranking loss function has converged.

17. The method of claim 1 wherein the selecting a set of images comprises selecting a predetermined number of the other images that are most similar to the query image based on their similarities.

18. The method of claim 17 wherein the transmitting a set of identifiers includes transmitting the set of identifiers representative of the set of the other images to the client device in a ranked order according to the similarities in decreasing order.

19. An image retrieval system, comprising:
one or more processors; and
memory including code that, when executed by the one or more processors, perform functions including:
  obtaining a query image from a client device;
  generating a global feature descriptor of the query image by inputting the query image into a convolutional neural network (CNN) and obtaining the global feature descriptor in an embedding space as an output of the CNN,
  wherein parameters of the CNN are learned during training of the CNN on a batch of training images using a listwise ranking loss function and optimizing a quantized mean average precision ranking evaluation metric;
  determining similarities between the query image and other images based on distances in the embedding space between the global feature descriptor of the query image and global feature descriptors of the other images, respectively;
  ranking the other images based on the similarities between the query image and the other images, respectively;
  selecting a set of the other images based on the similarities between the query image and the other images; and
  transmitting a set of identifiers representative of the set of the other images to the client device.

20. An image retrieval system, comprising:
processing circuitry obtaining a query image from a client device;
processing circuitry for generating a global feature descriptor of the query image by inputting the query image into a convolutional neural network (CNN) and obtaining the global feature descriptor in an embedding space as an output of the CNN,
wherein parameters of the CNN are learned during training of the CNN on a batch of training images using a listwise ranking loss function and optimizing a quantized mean average precision ranking evaluation metric;
processing circuitry for determining similarities between the query image and other images based on distances in the embedding space between the global feature descriptor of the query image and global feature descriptors of the other images, respectively;
processing circuitry for ranking the other images based on the similarities between the query image and the other images, respectively;
processing circuitry for selecting a set of the other images based on the similarities between the query image and the other images; and
processing circuitry for transmitting a set of identifiers representative of the set of the other images to the client device.

21. A computer-implemented method for training learnable parameters of a convolutional neural network (CNN) using a batch of training images, the method comprising steps of:
(1) by one or more processors, computing a global feature descriptor for each of the training images in an embedding space;
(2) by the one or more processors, discarding from memory intermediary tensors obtained during the computation of the global feature descriptors;
(3) by the one or more processors, determining similarities between each pair of the training images, a listwise ranking loss function, and gradients of the listwise ranking loss function with respect to the global feature descriptors, without performing back-propagation of the gradients to the learnable parameters;
(4) processing all the images of the batch by:
  (a) selecting a given one of the training images;
  (b) re-computing the global feature descriptor of the one of the training images and the gradients of the listwise ranking loss function with respect to the learnable parameters of the CNN, and maintaining the intermediary tensors in the memory;
  (c) for each learnable parameter of the CNN, adding the contribution of the one of the training images to an overall gradient of the listwise ranking loss function with respect to that learnable parameter;
  (d) repeating steps (a)-(c) until each of the training images has been selected; and
  (e) ending the processing when each of the training images has been selected;
(5) after the ending of the processing, back-propagating each overall gradient of the listwise ranking loss function to adapt the learnable parameters of the CNN; and
(6) repeating steps (1)-(5) until it is determined that the listwise ranking loss function has reached a minimum value.

* * * * *